US007766624B2

(12) United States Patent
Arinci et al.

(10) Patent No.: US 7,766,624 B2
(45) Date of Patent: Aug. 3, 2010

(54) ROTOR BLADE FOR A NINTH PHASE OF A COMPRESSOR

(75) Inventors: Paolo Arinci, Florence (IT); Salvatore Lorusso, Florence (IT); Alessio Novori, Florence (IT)

(73) Assignee: Nuovo Pignone S.p.A., Florence (IT)

(*) Notice: Subject to any disclaimer, the term of this patent is extended or adjusted under 35 U.S.C. 154(b) by 739 days.

(21) Appl. No.: 11/674,319

(22) Filed: Feb. 13, 2007

(65) Prior Publication Data

US 2007/0201983 A1 Aug. 30, 2007

(30) Foreign Application Priority Data

Feb. 27, 2006 (IT) .............................. MI06A0340

(51) Int. Cl.
*B64C 27/46* (2006.01)

(52) U.S. Cl. .................. 416/223 R; 416/228; 416/235; 416/236 R; 416/243; 416/500

(58) Field of Classification Search ............. 416/223 R, 416/228, 235, 236 R, 243, 500
See application file for complete search history.

(56) References Cited

U.S. PATENT DOCUMENTS 3,012,709 A * 12/1961 Schnell ................... 416/236 R
3,193,185 A * 7/1965 Erwin et al. ................ 415/193
3,653,110 A * 4/1972 King et al. ............... 29/889.72
3,692,425 A * 9/1972 Erwin ........................ 415/181
3,706,512 A * 12/1972 Strelshik ................. 416/236 R
4,108,573 A * 8/1978 Wagner .................. 416/236 A
4,116,584 A * 9/1978 Bammert et al. ......... 415/199.5
4,128,363 A * 12/1978 Fujikake et al. ......... 416/236 A
6,503,053 B2 * 1/2003 Huebner ..................... 415/191
6,565,324 B1 * 5/2003 Phillipsen et al. ....... 416/236 R
2005/0047915 A1 3/2005 Jarrah

* cited by examiner

*Primary Examiner*—Igor Kershteyn
(74) *Attorney, Agent, or Firm*—Global Patent Operation

(57) ABSTRACT

The invention relates to a blade of a rotor of a ninth phase of a compressor, which can be defined by coordinates of a discreet combination of points, in a Cartesian reference system (X, Y, Z), wherein the axis (Z) is a radial axis intersecting the central axis of the compressor, the blade having a profile which can be identified by having a series of closed intersection curves between the profile itself and planes (X, Y) lying at distances (Z) from the central axis, the blade also comprising a thickening, substantially parallel to a base portion of the blade itself, fixable to said rotor, said thickening being substantially situated half-way up the blade and being suitable for shifting the natural resonance frequencies of the blade itself outside a functioning frequency range of said rotor.

19 Claims, 2 Drawing Sheets

ROTOR BLADE FOR A NINTH PHASE OF A COMPRESSOR

BACKGROUND OF THE INVENTION

The present invention relates to a blade of a rotor of a ninth phase of a compressor.

DESCRIPTION

More specifically, the invention relates to a blade of a rotor having a high aerodynamic efficiency of a ninth phase of a compressor.

Compressors normally pressurize in their interior air removed from the outside.

The fluid penetrates the compressor through a series of inlet ducts.

In these channels, the gas has low pressure and low temperature characteristics, whereas as it passes through the compressor, the gas is compressed and its temperature increases.

In order to increase the efficiency, the compressor is normally divided into various phases, each of which has a rotor and a stator respectively equipped with a series of blades.

In recent years, technologically advanced compressors have been further improved, obtaining an increased improvement in efficiency, operating in particular on the aerodynamic conditions.

The geometric configuration of the blades in fact significantly influences the aerodynamic efficiency.

This depends on the fact that the geometric characteristics of the blade cause a distribution of the relative velocities in the fluid, consequently influencing the distribution of the limit layers along the walls and, ultimately, losses due to friction.

In particular, in the case of rotor blades of a ninth phase of a compressor an extremely high efficiency is required, at the same time maintaining an appropriate aerodynamic and mechanical load.

In accordance with one exemplary aspect of the present invention, a blade of a rotor of a ninth phase of a compressor avoids or in any case reduces resonance problems due to flexural vibrations which reduce the life of the component, and at the same time allows a high aerodynamic efficiency.

In accordance with another exemplary aspect of the present invention, a rotor of a ninth phase of a compressor allows a high aerodynamic efficiency and at the same time allows a high reliability of the compressor to be obtained with a consequent increase in the power of the turbine itself with the same compressor dimensions.

These characteristics and others according to the present invention are achieved by providing a rotor blade of a ninth phase of a compressor as specified in the claims.

BRIEF DESCRIPTION OF THE DRAWINGS

The characteristics and advantages of a rotor blade of a ninth phase of a compressor according to the present invention will appear more evident from the following illustrative and non-limiting description, referring to the enclosed schematic drawings in which.

DETAILED DESCRIPTION OF THE INVENTION

Figure 2:
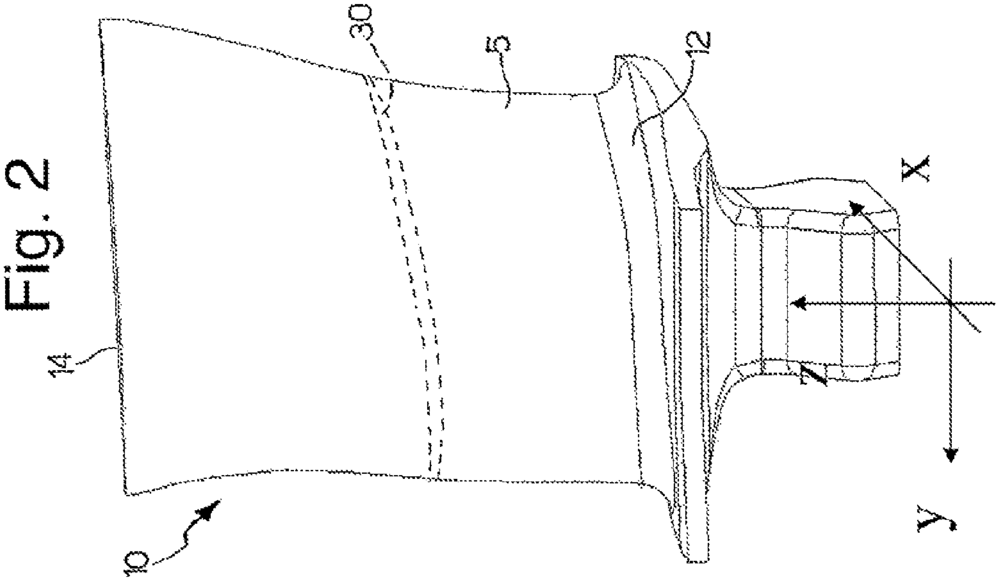
FIG. 2 is a raised view of the opposite side of the blade of FIG. 1.
Figure 1:
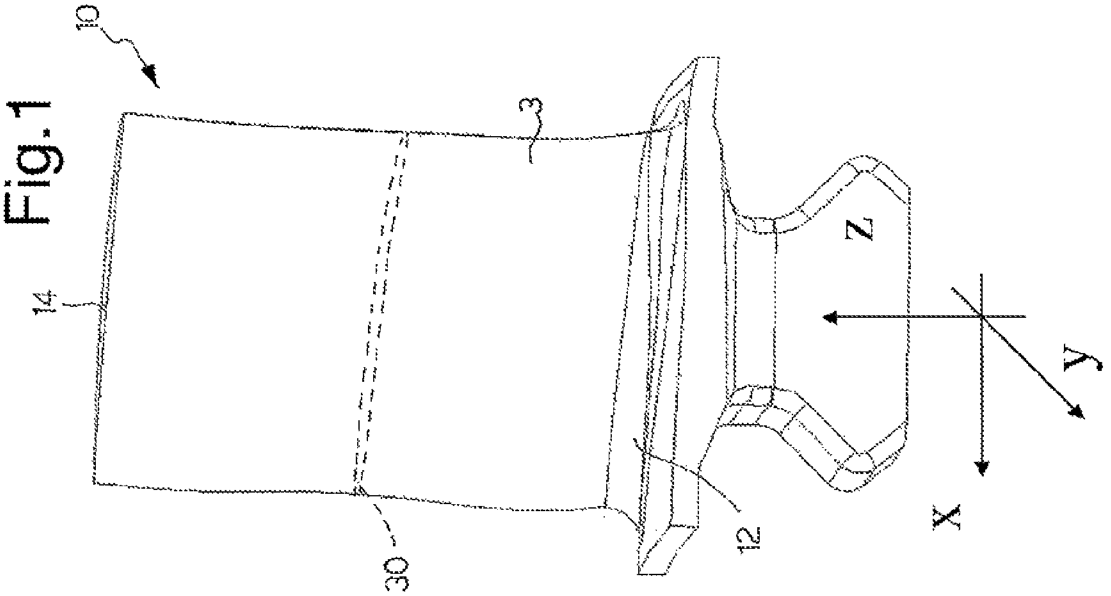
FIG. 1 is a raised view of a rotor blade of a compressor produced with an aerodynamic profile according to the present invention.

With reference to the figures, a blade 10 is provided of a rotor of a ninth phase of a compressor.

Said blade 10 is defined by means of coordinates of a discreet combination of points, in a Cartesian reference system (X, Y, Z), wherein the axis (Z) is a radial axis intersecting the central axis of the compressor, not shown.

The profile of the blade 10 is identified by means of a series of closed intersection curves between the profile itself and planes (X, Y) lying at distances (Z) from the central axis.

The profile of said blade 10 comprises a first substantially concave surface 3, which is pressurized, and a second substantially convex surface 5 which is in depression and opposite the first.

The two surfaces 3, 5 are continuous and joined to each other, and together form the profile of said blade 10.

At a base portion 12, commonly called "foot" of the blade 10, according to the known art there is a connecting joint with the aerodynamic profile of the blade 10 itself, said base portion 12 being suitable for being fixed to said rotor of said compressor.

Said blade 10 comprises a thickening 30, i.e. a prolonged portion having a greater thickness with respect to the adjacent portions, which is substantially parallel to said base portion 12 so as to shift the resonance frequencies of said blade 10 outside a functioning frequency range of the rotor itself, thus reducing or in any case avoiding problems of instability and vibrations of the blade 10 and rotor.

This advantageously leads to an increase in both the useful life and reliability of the rotor and compressor itself.

Said thickening 30 relates to at least one section or closed curve, and is also situated half-way up the blade 10.

In other words, said thickening 30 confers a dynamic behaviour to said blade which is such as to have flexural frequencies which fall outside a functioning velocity range of the rotor of said compressor and consequently such that there is no intensification of the maximum flexural deformation of the blade during the functioning of the compressor.

This consequently leads to a higher performance of the compressor, of the rotor and a longer useful life of its components, as problems of resonance such as those described above are avoided.

The clearances and tolerances of the blade and stator can therefore be dimensioned so as to further increase the performances of the compressor itself.

This is possible as the blade 10 is prevented, upon deforming, from causing a contact and relative friction against the relative stator.

In particular, each closed curve has a maximum thickness determined by the maximum distance between said first surface 3 and said second surface 5.

Said maximum surface of each closed curve, along the height of the blade 10, moving towards a free end 14 of the blade 10, has first a decreasing and then an increasing trend, followed again by a decreasing and finally increasing trend, with two different slopes, said blade 10 comprising a further thickening substantially parallel to said base portion 12 and situated in particular close to said free end 14.

Figure 3:
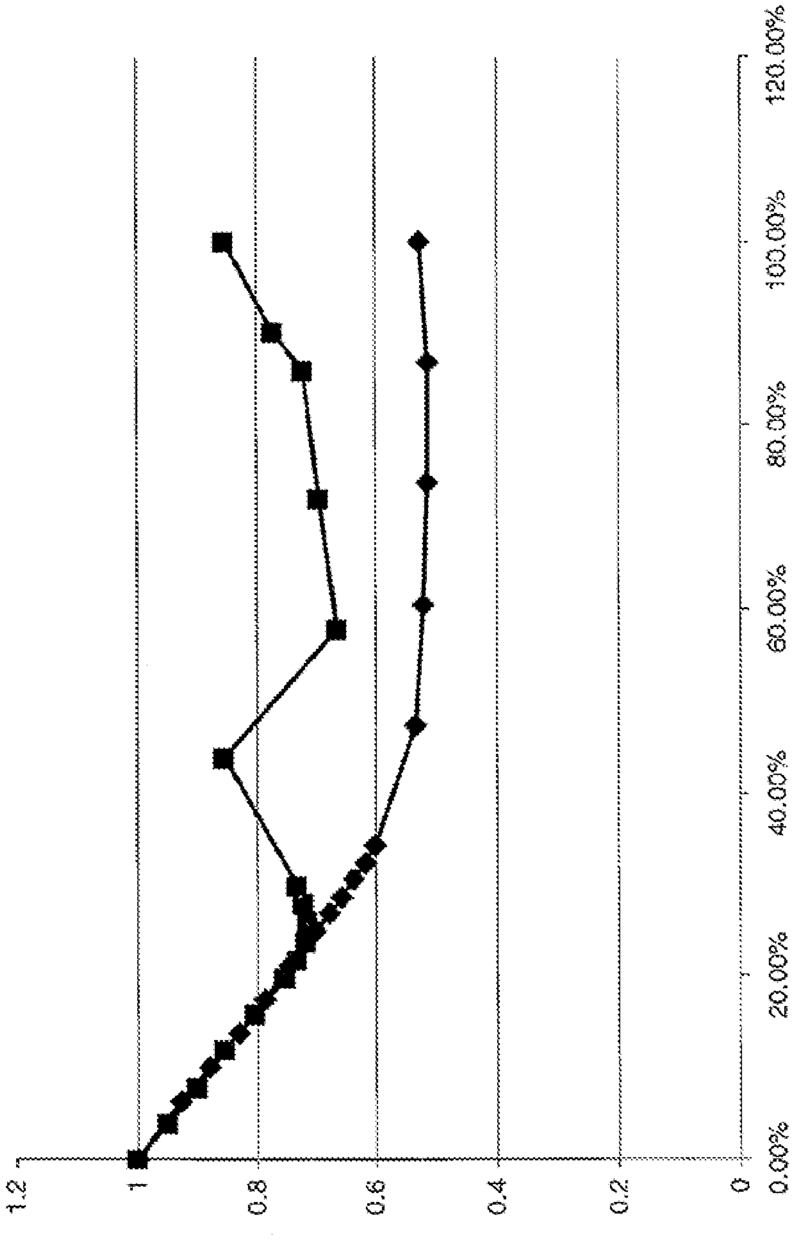
FIG. 3 is a diagram of the maximum thickness trend of a blade according to the present invention, with respect to its height.

For example, the variation in the trend of the maximum thickness is shown in FIG. 3, in which it is compared with the maximum thickness trend of a blade according to the known art. In particular, in FIG. 3, the abscissa indicates the height of the blade 10, whereas the ordinate represents the maximum thickness of the blade 10, adimensionalized by putting the thickness in correspondence with the foot of the blade equal to 1. In the diagram shown in FIG. 3, the lower line represents the maximum thickness trend of a blade according to the known art, whereas the upper line shows the trend of the maximum thickness of the blade according to the present invention.

Along the height of the blade 10 in the direction of a free end 14 of the blade 10, said maximum thickness preferably has a trend which can be described by four different mathematical functions, identifying four different regions of the blade.

In the first region, that closest to the blade 10, up to a height equal to 45% of the height of the blade, the maximum thickness trend can be described by a polynomial function of the fourth degree (first decreasing and subsequently increasing) and in particular said polynomial function is:

$$T\text{max}=-34.522*h^4+36.4*h^3-8.4113*h^2-0.7259*h+0.9961$$

wherein h represents the percentage of the height of the blade 10, and wherein Tmax is the maximum adimensionalized thickness relating to that closed curve corresponding to that percentage of the height of the blade 10.

In the subsequent region, ranging from 45% to 58% of the height of the blade 10, the thickness varies according to the linear function (decreasing):

$$T\text{max}=-1.3509*h+1.4459$$

Therefore, between 58% and 86% of the height of the blade 10, the thickness trend is represented by the linear function (increasing):

$$T\text{max}=0.2074*h+0.5443$$

Finally, between 86% and the free end 14 of the blade, the maximum thickness varies according to the linear function (increasing):

$$T\text{max}=0.9058*h-0.0518$$

The profile of each blade 10 was also suitably shaped to be able to maintain the same efficiency at high levels.

The aerodynamic profile of each blade 10 is preferably defined by means of a series of closed curves whose coordinates are defined with respect to a Cartesian reference system X, Y, Z, wherein the axis Z is a radial axis intersecting the central axis of the turbine, and said closed curves lying at distances Z from the central axis are defined according to Table I, whose values, expressed in millimeters, refer to an aerodynamic profile at room temperature, in particular 25° C.

TABLE 1

| X | Y | Z |
|---|---|---|
| −8.852 | 9.902 | 255.999 |
| −8.847 | 9.904 | 255.999 |
| −8.835 | 9.905 | 255.999 |
| −8.812 | 9.901 | 255.999 |
| −8.771 | 9.880 | 255.999 |
| −8.717 | 9.833 | 255.999 |
| −8.632 | 9.734 | 255.999 |
| −8.533 | 9.594 | 255.999 |
| −8.410 | 9.400 | 255.999 |
| −8.263 | 9.152 | 255.999 |
| −8.080 | 8.826 | 255.999 |
| −7.871 | 8.449 | 255.999 |
| −7.643 | 8.050 | 255.999 |
| −7.382 | 7.603 | 255.999 |
| −7.086 | 7.110 | 255.999 |

TABLE 1-continued

| X | Y | Z |
|---|---|---|
| −6.751 | 6.573 | 255.999 |
| −6.390 | 6.019 | 255.999 |
| −6.005 | 5.448 | 255.999 |
| −5.593 | 4.860 | 255.999 |
| −5.155 | 4.256 | 255.999 |
| −4.688 | 3.638 | 255.999 |
| −4.190 | 3.006 | 255.999 |
| −3.660 | 2.364 | 255.999 |
| −3.096 | 1.711 | 255.999 |
| −2.520 | 1.069 | 255.999 |
| −1.933 | 0.30278 | 255.999 |
| −1.338 | −0.189 | 255.999 |
| −0.735 | −0.806 | 255.999 |
| −0.126 | −1.417 | 255.999 |
| 0.33958 | −2.023 | 255.999 |
| 1.108 | −2.624 | 255.999 |
| 1.732 | −3.219 | 255.999 |
| 2.362 | −3.809 | 255.999 |
| 2.995 | −4.395 | 255.999 |
| 3.631 | −4.978 | 255.999 |
| 4.249 | −5.538 | 255.999 |
| 4.849 | −6.075 | 255.999 |
| 5.432 | −6.588 | 255.999 |
| 5.998 | −7.077 | 255.999 |
| 6.545 | −7.543 | 255.999 |
| 7.075 | −7.986 | 255.999 |
| 7.586 | −8.405 | 255.999 |
| 8.056 | −8.784 | 255.999 |
| 8.485 | −9.124 | 255.999 |
| 8.871 | −9.424 | 255.999 |
| 9.214 | −9.685 | 255.999 |
| 9.515 | −9.908 | 255.999 |
| 9.771 | −10.093 | 255.999 |
| 9.992 | −10.249 | 255.999 |
| 10.179 | −10.379 | 255.999 |
| 10.332 | −10.485 | 255.999 |
| 10.426 | −10.600 | 255.999 |
| 10.461 | −10.708 | 255.999 |
| 10.465 | −10.793 | 255.999 |
| 10.452 | −10.864 | 255.999 |
| 10.432 | −10.917 | 255.999 |
| 10.411 | −10.955 | 255.999 |
| 10.385 | −10.991 | 255.999 |
| 10.343 | −11.034 | 255.999 |
| 10.282 | −11.077 | 255.999 |
| 10.199 | −11.110 | 255.999 |
| 10.081 | −11.119 | 255.999 |
| 9.933 | −11.073 | 255.999 |
| 9.765 | −10.976 | 255.999 |
| 9.561 | −10.857 | 255.999 |
| 9.318 | −10.717 | 255.999 |
| 9.034 | −10.552 | 255.999 |
| 8.697 | −10.359 | 255.999 |
| 8.308 | −10.137 | 255.999 |
| 7.867 | −9.884 | 255.999 |
| 7.376 | −9.600 | 255.999 |
| 6.835 | −9.282 | 255.999 |
| 6.245 | −8.931 | 255.999 |
| 5.633 | −8.559 | 255.999 |
| 4.999 | −8.165 | 255.999 |
| 4.344 | −7.748 | 255.999 |
| 3.670 | −7.305 | 255.999 |
| 2.977 | −6.837 | 255.999 |
| 2.267 | −6.341 | 255.999 |
| 1.543 | −5.816 | 255.999 |
| 0.57639 | −5.280 | 255.999 |
| 0.08958 | −4.730 | 255.999 |
| −0.558 | −4.165 | 255.999 |
| −1.230 | −3.583 | 255.999 |
| −1.886 | −2.983 | 255.999 |
| −2.526 | −2.366 | 255.999 |
| −3.146 | −1.727 | 255.999 |
| −3.744 | −1.064 | 255.999 |
| −4.317 | −0.373 | 255.999 |
| −4.864 | 0.24028 | 255.999 |
| −5.383 | 1.085 | 255.999 |
| −5.861 | 1.816 | 255.999 |

TABLE 1-continued

| X | Y | Z |
|---|---|---|
| −6.301 | 2.535 | 255.999 |
| −6.704 | 3.242 | 255.999 |
| −7.070 | 3.934 | 255.999 |
| −7.401 | 4.611 | 255.999 |
| −7.697 | 5.271 | 255.999 |
| −7.962 | 5.912 | 255.999 |
| −8.194 | 6.533 | 255.999 |
| −8.387 | 7.104 | 255.999 |
| −8.547 | 7.623 | 255.999 |
| −8.675 | 8.088 | 255.999 |
| −8.783 | 8.528 | 255.999 |
| −8.864 | 8.911 | 255.999 |
| −8.914 | 9.209 | 255.999 |
| −8.940 | 9.449 | 255.999 |
| −8.945 | 9.630 | 255.999 |
| −8.932 | 9.765 | 255.999 |
| −8.911 | 9.837 | 255.999 |
| −8.887 | 9.878 | 255.999 |
| −8.869 | 9.894 | 255.999 |
| −8.858 | 9.900 | 255.999 |
| −8.675 | 9.767 | 258.001 |
| −8.669 | 9.769 | 258.001 |
| −8.658 | 9.770 | 258.001 |
| −8.635 | 9.767 | 258.001 |
| −8.593 | 9.746 | 258.001 |
| −8.538 | 9.700 | 258.001 |
| −8.452 | 9.604 | 258.001 |
| −8.349 | 9.465 | 258.001 |
| −8.222 | 9.274 | 258.001 |
| −8.069 | 9.031 | 258.001 |
| −7.877 | 8.711 | 258.001 |
| −7.657 | 8.340 | 258.001 |
| −7.419 | 7.947 | 258.001 |
| −7.147 | 7.508 | 258.001 |
| −6.840 | 7.022 | 258.001 |
| −6.494 | 6.493 | 258.001 |
| −6.123 | 5.948 | 258.001 |
| −5.726 | 5.385 | 258.001 |
| −5.304 | 4.805 | 258.001 |
| −4.855 | 4.211 | 258.001 |
| −4.377 | 3.601 | 258.001 |
| −3.871 | 2.978 | 258.001 |
| −3.333 | 2.342 | 258.001 |
| −2.766 | 1.694 | 258.001 |
| −2.187 | 1.055 | 258.001 |
| −1.600 | 0.29514 | 258.001 |
| −1.004 | −0.198 | 258.001 |
| −0.402 | −0.814 | 258.001 |
| 0.14236 | −1.425 | 258.001 |
| 0.56736 | −2.031 | 258.001 |
| 1.433 | −2.634 | 258.001 |
| 2.053 | −3.232 | 258.001 |
| 2.677 | −3.827 | 258.001 |
| 3.304 | −4.418 | 258.001 |
| 3.933 | −5.006 | 258.001 |
| 4.545 | −5.571 | 258.001 |
| 5.139 | −6.113 | 258.001 |
| 5.715 | −6.632 | 258.001 |
| 6.274 | −7.127 | 258.001 |
| 6.815 | −7.600 | 258.001 |
| 7.337 | −8.049 | 258.001 |
| 7.841 | −8.476 | 258.001 |
| 8.305 | −8.861 | 258.001 |
| 8.728 | −9.206 | 258.001 |
| 9.109 | −9.512 | 258.001 |
| 9.448 | −9.778 | 258.001 |
| 9.744 | −10.005 | 258.001 |
| 9.997 | −10.194 | 258.001 |
| 10.215 | −10.354 | 258.001 |
| 10.399 | −10.486 | 258.001 |
| 10.552 | −10.594 | 258.001 |
| 10.671 | −10.684 | 258.001 |
| 10.731 | −10.780 | 258.001 |
| 10.749 | −10.863 | 258.001 |
| 10.744 | −10.934 | 258.001 |
| 10.727 | −10.988 | 258.001 |
| 10.707 | −11.026 | 258.001 |

TABLE 1-continued

| X | Y | Z |
|---|---|---|
| 10.680 | −11.062 | 258.001 |
| 10.636 | −11.102 | 258.001 |
| 10.570 | −11.137 | 258.001 |
| 10.482 | −11.152 | 258.001 |
| 10.366 | −11.127 | 258.001 |
| 10.233 | −11.049 | 258.001 |
| 10.067 | −10.949 | 258.001 |
| 9.866 | −10.828 | 258.001 |
| 9.626 | −10.684 | 258.001 |
| 9.346 | −10.517 | 258.001 |
| 9.013 | −10.321 | 258.001 |
| 8.629 | −10.094 | 258.001 |
| 8.194 | −9.837 | 258.001 |
| 7.710 | −9.547 | 258.001 |
| 7.176 | −9.224 | 258.001 |
| 6.594 | −8.867 | 258.001 |
| 5.990 | −8.489 | 258.001 |
| 5.364 | −8.089 | 258.001 |
| 4.718 | −7.666 | 258.001 |
| 4.052 | −7.219 | 258.001 |
| 3.368 | −6.746 | 258.001 |
| 2.667 | −6.245 | 258.001 |
| 1.952 | −5.716 | 258.001 |
| 1.247 | −5.175 | 258.001 |
| 0.38472 | −4.623 | 258.001 |
| −0.127 | −4.057 | 258.001 |
| −0.794 | −3.477 | 258.001 |
| −1.448 | −2.882 | 258.001 |
| −2.087 | −2.272 | 258.001 |
| −2.710 | −1.644 | 258.001 |
| −3.314 | −0.995 | 258.001 |
| −3.895 | −0.323 | 258.001 |
| −4.454 | 0.25903 | 258.001 |
| −4.991 | 1.094 | 258.001 |
| −5.485 | 1.807 | 258.001 |
| −5.940 | 2.511 | 258.001 |
| −6.356 | 3.203 | 258.001 |
| −6.736 | 3.884 | 258.001 |
| −7.080 | 4.549 | 258.001 |
| −7.389 | 5.198 | 258.001 |
| −7.668 | 5.828 | 258.001 |
| −7.915 | 6.439 | 258.001 |
| −8.123 | 7.002 | 258.001 |
| −8.297 | 7.513 | 258.001 |
| −8.438 | 7.971 | 258.001 |
| −8.559 | 8.404 | 258.001 |
| −8.653 | 8.782 | 258.001 |
| −8.713 | 9.076 | 258.001 |
| −8.746 | 9.313 | 258.001 |
| −8.757 | 9.493 | 258.001 |
| −8.749 | 9.627 | 258.001 |
| −8.731 | 9.700 | 258.001 |
| −8.708 | 9.742 | 258.001 |
| −8.691 | 9.759 | 258.001 |
| −8.680 | 9.765 | 258.001 |
| −8.508 | 9.651 | 259.194 |
| −8.503 | 9.652 | 259.194 |
| −8.491 | 9.654 | 259.194 |
| −8.468 | 9.651 | 259.194 |
| −8.427 | 9.631 | 259.194 |
| −8.371 | 9.586 | 259.194 |
| −8.283 | 9.491 | 259.194 |
| −8.177 | 9.355 | 259.194 |
| −8.046 | 9.168 | 259.194 |
| −7.887 | 8.929 | 259.194 |
| −7.688 | 8.614 | 259.194 |
| −7.459 | 8.249 | 259.194 |
| −7.212 | 7.863 | 259.194 |
| −6.931 | 7.429 | 259.194 |
| −6.615 | 6.950 | 259.194 |
| −6.261 | 6.428 | 259.194 |
| −5.882 | 5.888 | 259.194 |
| −5.480 | 5.331 | 259.194 |
| −5.052 | 4.757 | 259.194 |
| −4.598 | 4.166 | 259.194 |
| −4.117 | 3.561 | 259.194 |
| −3.607 | 2.941 | 259.194 |

TABLE 1-continued

| X | Y | Z |
|---|---|---|
| −3.069 | 2.307 | 259.194 |
| −2.502 | 1.660 | 259.194 |
| −1.925 | 1.022 | 259.194 |
| −1.339 | 0.27222 | 259.194 |
| −0.745 | −0.231 | 259.194 |
| −0.144 | −0.847 | 259.194 |
| 0.32083 | −1.458 | 259.194 |
| 1.073 | −2.064 | 259.194 |
| 1.687 | −2.667 | 259.194 |
| 2.304 | −3.266 | 259.194 |
| 2.925 | −3.862 | 259.194 |
| 3.549 | −4.454 | 259.194 |
| 4.175 | −5.044 | 259.194 |
| 4.784 | −5.611 | 259.194 |
| 5.374 | −6.155 | 259.194 |
| 5.946 | −6.677 | 259.194 |
| 6.501 | −7.176 | 259.194 |
| 7.037 | −7.652 | 259.194 |
| 7.555 | −8.105 | 259.194 |
| 8.055 | −8.535 | 259.194 |
| 8.515 | −8.924 | 259.194 |
| 8.933 | −9.273 | 259.194 |
| 9.311 | −9.582 | 259.194 |
| 9.646 | −9.851 | 259.194 |
| 9.940 | −10.081 | 259.194 |
| 10.190 | −10.273 | 259.194 |
| 10.406 | −10.435 | 259.194 |
| 10.588 | −10.570 | 259.194 |
| 10.739 | −10.679 | 259.194 |
| 10.860 | −10.766 | 259.194 |
| 10.943 | −10.845 | 259.194 |
| 10.975 | −10.924 | 259.194 |
| 10.978 | −10.996 | 259.194 |
| 10.963 | −11.052 | 259.194 |
| 10.943 | −11.090 | 259.194 |
| 10.915 | −11.125 | 259.194 |
| 10.868 | −11.161 | 259.194 |
| 10.798 | −11.187 | 259.194 |
| 10.709 | −11.185 | 259.194 |
| 10.603 | −11.133 | 259.194 |
| 10.472 | −11.052 | 259.194 |
| 10.309 | −10.951 | 259.194 |
| 10.110 | −10.828 | 259.194 |
| 9.873 | −10.683 | 259.194 |
| 9.595 | −10.513 | 259.194 |
| 9.266 | −10.314 | 259.194 |
| 8.886 | −10.085 | 259.194 |
| 8.456 | −9.824 | 259.194 |
| 7.977 | −9.531 | 259.194 |
| 7.449 | −9.204 | 259.194 |
| 6.873 | −8.842 | 259.194 |
| 6.275 | −8.460 | 259.194 |
| 5.655 | −8.057 | 259.194 |
| 5.015 | −7.630 | 259.194 |
| 4.355 | −7.180 | 259.194 |
| 3.678 | −6.705 | 259.194 |
| 2.985 | −6.205 | 259.194 |
| 2.278 | −5.676 | 259.194 |
| 1.581 | −5.137 | 259.194 |
| 0.62222 | −4.586 | 259.194 |
| 0.15417 | −4.023 | 259.194 |
| −0.440 | −3.446 | 259.194 |
| −1.088 | −2.855 | 259.194 |
| −1.722 | −2.249 | 259.194 |
| −2.340 | −1.626 | 259.194 |
| −2.941 | −0.984 | 259.194 |
| −3.522 | −0.322 | 259.194 |
| −4.082 | 0.25139 | 259.194 |
| −4.622 | 1.069 | 259.194 |
| −5.124 | 1.773 | 259.194 |
| −5.588 | 2.470 | 259.194 |
| −6.014 | 3.155 | 259.194 |
| −6.405 | 3.828 | 259.194 |
| −6.760 | 4.486 | 259.194 |
| −7.084 | 5.127 | 259.194 |
| −7.377 | 5.750 | 259.194 |
| −7.640 | 6.353 | 259.194 |

TABLE 1-continued

| X | Y | Z |
|---|---|---|
| −7.864 | 6.909 | 259.194 |
| −8.053 | 7.413 | 259.194 |
| −8.209 | 7.866 | 259.194 |
| −8.345 | 8.294 | 259.194 |
| −8.451 | 8.668 | 259.194 |
| −8.521 | 8.959 | 259.194 |
| −8.563 | 9.195 | 259.194 |
| −8.580 | 9.374 | 259.194 |
| −8.577 | 9.509 | 259.194 |
| −8.562 | 9.582 | 259.194 |
| −8.540 | 9.625 | 259.194 |
| −8.524 | 9.642 | 259.194 |
| −8.514 | 9.648 | 259.194 |
| −8.337 | 9.565 | 260.388 |
| −8.331 | 9.567 | 260.388 |
| −8.320 | 9.569 | 260.388 |
| −8.297 | 9.566 | 260.388 |
| −8.255 | 9.547 | 260.388 |
| −8.198 | 9.503 | 260.388 |
| −8.109 | 9.409 | 260.388 |
| −8.001 | 9.275 | 260.388 |
| −7.867 | 9.090 | 260.388 |
| −7.705 | 8.854 | 260.388 |
| −7.499 | 8.543 | 260.388 |
| −7.264 | 8.183 | 260.388 |
| −7.010 | 7.801 | 260.388 |
| −6.723 | 7.373 | 260.388 |
| −6.401 | 6.899 | 260.388 |
| −6.041 | 6.381 | 260.388 |
| −5.658 | 5.845 | 260.388 |
| −5.252 | 5.291 | 260.388 |
| −4.820 | 4.720 | 260.388 |
| −4.364 | 4.133 | 260.388 |
| −3.880 | 3.529 | 260.388 |
| −3.370 | 2.911 | 260.388 |
| −2.831 | 2.278 | 260.388 |
| −2.265 | 1.632 | 260.388 |
| −1.689 | 0.69028 | 260.388 |
| −1.105 | 0.25278 | 260.388 |
| −0.514 | −0.259 | 260.388 |
| 0.084 | −0.876 | 260.388 |
| 0.47708 | −1.489 | 260.388 |
| 1.294 | −2.096 | 260.388 |
| 1.906 | −2.701 | 260.388 |
| 2.520 | −3.301 | 260.388 |
| 3.139 | −3.898 | 260.388 |
| 3.760 | −4.492 | 260.388 |
| 4.384 | −5.083 | 260.388 |
| 4.990 | −5.651 | 260.388 |
| 5.578 | −6.197 | 260.388 |
| 6.147 | −6.720 | 260.388 |
| 6.699 | −7.221 | 260.388 |
| 7.232 | −7.699 | 260.388 |
| 7.747 | −8.154 | 260.388 |
| 8.245 | −8.586 | 260.388 |
| 8.702 | −8.977 | 260.388 |
| 9.118 | −9.328 | 260.388 |
| 9.494 | −9.638 | 260.388 |
| 9.827 | −9.909 | 260.388 |
| 10.119 | −10.141 | 260.388 |
| 10.367 | −10.335 | 260.388 |
| 10.581 | −10.498 | 260.388 |
| 10.762 | −10.634 | 260.388 |
| 10.912 | −10.745 | 260.388 |
| 11.032 | −10.833 | 260.388 |
| 11.118 | −10.909 | 260.388 |
| 11.153 | −10.987 | 260.388 |
| 11.157 | −11.059 | 260.388 |
| 11.142 | −11.115 | 260.388 |
| 11.122 | −11.153 | 260.388 |
| 11.093 | −11.187 | 260.388 |
| 11.045 | −11.222 | 260.388 |
| 10.975 | −11.244 | 260.388 |
| 10.887 | −11.238 | 260.388 |
| 10.783 | −11.182 | 260.388 |
| 10.654 | −11.099 | 260.388 |
| 10.493 | −10.996 | 260.388 |

TABLE 1-continued

| X | Y | Z |
|---|---|---|
| 10.297 | −10.871 | 260.388 |
| 10.063 | −10.723 | 260.388 |
| 9.789 | −10.550 | 260.388 |
| 9.465 | −10.347 | 260.388 |
| 9.090 | −10.114 | 260.388 |
| 8.666 | −9.848 | 260.388 |
| 8.193 | −9.549 | 260.388 |
| 7.672 | −9.216 | 260.388 |
| 7.104 | −8.848 | 260.388 |
| 6.514 | −8.460 | 260.388 |
| 5.902 | −8.050 | 260.388 |
| 5.270 | −7.617 | 260.388 |
| 4.619 | −7.162 | 260.388 |
| 3.950 | −6.683 | 260.388 |
| 3.265 | −6.178 | 260.388 |
| 2.564 | −5.646 | 260.388 |
| 1.874 | −5.104 | 260.388 |
| 1.194 | −4.550 | 260.388 |
| 0.36458 | −3.983 | 260.388 |
| −0.132 | −3.404 | 260.388 |
| −0.777 | −2.810 | 260.388 |
| −1.407 | −2.202 | 260.388 |
| −2.024 | −1.577 | 260.388 |
| −2.624 | −0.935 | 260.388 |
| −3.206 | −0.273 | 260.388 |
| −3.769 | 0.28472 | 260.388 |
| −4.313 | 1.114 | 260.388 |
| −4.818 | 1.811 | 260.388 |
| −5.284 | 2.498 | 260.388 |
| −5.714 | 3.173 | 260.388 |
| −6.111 | 3.836 | 260.388 |
| −6.474 | 4.483 | 260.388 |
| −6.805 | 5.113 | 260.388 |
| −7.109 | 5.725 | 260.388 |
| −7.383 | 6.318 | 260.388 |
| −7.619 | 6.863 | 260.388 |
| −7.819 | 7.359 | 260.388 |
| −7.987 | 7.803 | 260.388 |
| −8.133 | 8.224 | 260.388 |
| −8.249 | 8.592 | 260.388 |
| −8.327 | 8.879 | 260.388 |
| −8.376 | 9.111 | 260.388 |
| −8.398 | 9.288 | 260.388 |
| −8.399 | 9.422 | 260.388 |
| −8.387 | 9.495 | 260.388 |
| −8.368 | 9.538 | 260.388 |
| −8.352 | 9.556 | 260.388 |
| −8.342 | 9.562 | 260.388 |
| −8.170 | 9.508 | 261.582 |
| −8.164 | 9.510 | 261.582 |
| −8.153 | 9.512 | 261.582 |
| −8.130 | 9.509 | 261.582 |
| −8.088 | 9.490 | 261.582 |
| −8.031 | 9.446 | 261.582 |
| −7.941 | 9.354 | 261.582 |
| −7.832 | 9.222 | 261.582 |
| −7.695 | 9.038 | 261.582 |
| −7.530 | 8.804 | 261.582 |
| −7.321 | 8.496 | 261.582 |
| −7.081 | 8.140 | 261.582 |
| −6.823 | 7.761 | 261.582 |
| −6.531 | 7.336 | 261.582 |
| −6.205 | 6.866 | 261.582 |
| −5.841 | 6.352 | 261.582 |
| −5.454 | 5.819 | 261.582 |
| −5.045 | 5.268 | 261.582 |
| −4.611 | 4.700 | 261.582 |
| −4.152 | 4.114 | 261.582 |
| −3.668 | 3.512 | 261.582 |
| −3.156 | 2.895 | 261.582 |
| −2.618 | 2.263 | 261.582 |
| −2.052 | 1.618 | 261.582 |
| −1.478 | 0.68056 | 261.582 |
| −0.896 | 0.24236 | 261.582 |
| −0.307 | −0.277 | 261.582 |
| 0.19931 | −0.896 | 261.582 |
| 0.61597 | −1.511 | 261.582 |

TABLE 1-continued

| X | Y | Z |
|---|---|---|
| 1.491 | −2.122 | 261.582 |
| 2.099 | −2.728 | 261.582 |
| 2.711 | −3.330 | 261.582 |
| 3.327 | −3.929 | 261.582 |
| 3.945 | −4.525 | 261.582 |
| 4.566 | −5.118 | 261.582 |
| 5.170 | −5.688 | 261.582 |
| 5.755 | −6.235 | 261.582 |
| 6.322 | −6.760 | 261.582 |
| 6.871 | −7.263 | 261.582 |
| 7.402 | −7.742 | 261.582 |
| 7.915 | −8.199 | 261.582 |
| 8.410 | −8.633 | 261.582 |
| 8.865 | −9.026 | 261.582 |
| 9.280 | −9.378 | 261.582 |
| 9.653 | −9.690 | 261.582 |
| 9.985 | −9.963 | 261.582 |
| 10.275 | −10.196 | 261.582 |
| 10.522 | −10.391 | 261.582 |
| 10.735 | −10.556 | 261.582 |
| 10.915 | −10.693 | 261.582 |
| 11.064 | −10.805 | 261.582 |
| 11.183 | −10.894 | 261.582 |
| 11.268 | −10.970 | 261.582 |
| 11.303 | −11.048 | 261.582 |
| 11.306 | −11.119 | 261.582 |
| 11.291 | −11.174 | 261.582 |
| 11.271 | −11.212 | 261.582 |
| 11.242 | −11.246 | 261.582 |
| 11.193 | −11.280 | 261.582 |
| 11.123 | −11.301 | 261.582 |
| 11.035 | −11.292 | 261.582 |
| 10.933 | −11.234 | 261.582 |
| 10.806 | −11.150 | 261.582 |
| 10.646 | −11.046 | 261.582 |
| 10.453 | −10.919 | 261.582 |
| 10.222 | −10.768 | 261.582 |
| 9.951 | −10.592 | 261.582 |
| 9.630 | −10.386 | 261.582 |
| 9.260 | −10.147 | 261.582 |
| 8.841 | −9.876 | 261.582 |
| 8.375 | −9.572 | 261.582 |
| 7.860 | −9.233 | 261.582 |
| 7.299 | −8.858 | 261.582 |
| 6.716 | −8.463 | 261.582 |
| 6.112 | −8.047 | 261.582 |
| 5.488 | −7.608 | 261.582 |
| 4.845 | −7.147 | 261.582 |
| 4.184 | −6.661 | 261.582 |
| 3.507 | −6.151 | 261.582 |
| 2.814 | −5.614 | 261.582 |
| 2.130 | −5.068 | 261.582 |
| 1.457 | −4.510 | 261.582 |
| 0.55139 | −3.942 | 261.582 |
| 0.09931 | −3.360 | 261.582 |
| −0.496 | −2.764 | 261.582 |
| −1.121 | −2.154 | 261.582 |
| −1.733 | −1.529 | 261.582 |
| −2.329 | −0.888 | 261.582 |
| −2.909 | −0.229 | 261.582 |
| −3.471 | 0.31181 | 261.582 |
| −4.016 | 1.147 | 261.582 |
| −4.523 | 1.839 | 261.582 |
| −4.993 | 2.519 | 261.582 |
| −5.429 | 3.188 | 261.582 |
| −5.831 | 3.843 | 261.582 |
| −6.202 | 4.483 | 261.582 |
| −6.543 | 5.106 | 261.582 |
| −6.855 | 5.710 | 261.582 |
| −7.140 | 6.295 | 261.582 |
| −7.386 | 6.833 | 261.582 |
| −7.597 | 7.322 | 261.582 |
| −7.773 | 7.762 | 261.582 |
| −7.929 | 8.177 | 261.582 |
| −8.054 | 8.541 | 261.582 |
| −8.139 | 8.824 | 261.582 |
| −8.194 | 9.055 | 261.582 |

TABLE 1-continued

| X | Y | Z |
|---|---|---|
| −8.222 | 9.230 | 261.582 |
| −8.227 | 9.363 | 261.582 |
| −8.217 | 9.436 | 261.582 |
| −8.200 | 9.480 | 261.582 |
| −8.185 | 9.498 | 261.582 |
| −8.175 | 9.505 | 261.582 |
| −8.032 | 9.470 | 262.778 |
| −8.027 | 9.472 | 262.778 |
| −8.015 | 9.475 | 262.778 |
| −7.992 | 9.472 | 262.778 |
| −7.950 | 9.453 | 262.778 |
| −7.893 | 9.409 | 262.778 |
| −7.803 | 9.318 | 262.778 |
| −7.693 | 9.186 | 262.778 |
| −7.555 | 9.003 | 262.778 |
| −7.389 | 8.771 | 262.778 |
| −7.177 | 8.465 | 262.778 |
| −6.934 | 8.112 | 262.778 |
| −6.673 | 7.736 | 262.778 |
| −6.379 | 7.313 | 262.778 |
| −6.049 | 6.846 | 262.778 |
| −5.682 | 6.334 | 262.778 |
| −5.293 | 5.804 | 262.778 |
| −4.882 | 5.255 | 262.778 |
| −4.447 | 4.688 | 262.778 |
| −3.987 | 4.104 | 262.778 |
| −3.502 | 3.504 | 262.778 |
| −2.991 | 2.888 | 262.778 |
| −2.454 | 2.257 | 262.778 |
| −1.889 | 1.611 | 262.778 |
| −1.316 | 0.675 | 262.778 |
| −0.737 | 0.23542 | 262.778 |
| −0.152 | −0.289 | 262.778 |
| 0.30486 | −0.911 | 262.778 |
| 1.035 | −1.529 | 262.778 |
| 1.635 | −2.142 | 262.778 |
| 2.240 | −2.750 | 262.778 |
| 2.849 | −3.355 | 262.778 |
| 3.461 | −3.956 | 262.778 |
| 4.076 | −4.554 | 262.778 |
| 4.694 | −5.149 | 262.778 |
| 5.295 | −5.721 | 262.778 |
| 5.877 | −6.271 | 262.778 |
| 6.442 | −6.798 | 262.778 |
| 6.988 | −7.302 | 262.778 |
| 7.517 | −7.783 | 262.778 |
| 8.028 | −8.242 | 262.778 |
| 8.521 | −8.678 | 262.778 |
| 8.974 | −9.072 | 262.778 |
| 9.386 | −9.426 | 262.778 |
| 9.758 | −9.740 | 262.778 |
| 10.088 | −10.014 | 262.778 |
| 10.376 | −10.249 | 262.778 |
| 10.622 | −10.445 | 262.778 |
| 10.833 | −10.611 | 262.778 |
| 11.012 | −10.750 | 262.778 |
| 11.159 | −10.863 | 262.778 |
| 11.278 | −10.953 | 262.778 |
| 11.364 | −11.028 | 262.778 |
| 11.400 | −11.106 | 262.778 |
| 11.404 | −11.179 | 262.778 |
| 11.389 | −11.235 | 262.778 |
| 11.367 | −11.273 | 262.778 |
| 11.338 | −11.306 | 262.778 |
| 11.290 | −11.339 | 262.778 |
| 11.219 | −11.359 | 262.778 |
| 11.132 | −11.349 | 262.778 |
| 11.031 | −11.289 | 262.778 |
| 10.905 | −11.204 | 262.778 |
| 10.747 | −11.098 | 262.778 |
| 10.556 | −10.969 | 262.778 |
| 10.327 | −10.816 | 262.778 |
| 10.060 | −10.637 | 262.778 |
| 9.743 | −10.426 | 262.778 |
| 9.378 | −10.183 | 262.778 |
| 8.965 | −9.907 | 262.778 |
| 8.504 | −9.596 | 262.778 |

TABLE 1-continued

| X | Y | Z |
|---|---|---|
| 7.996 | −9.251 | 262.778 |
| 7.442 | −8.870 | 262.778 |
| 6.866 | −8.468 | 262.778 |
| 6.270 | −8.045 | 262.778 |
| 5.653 | −7.599 | 262.778 |
| 5.018 | −7.130 | 262.778 |
| 4.366 | −6.638 | 262.778 |
| 3.696 | −6.121 | 262.778 |
| 3.012 | −5.578 | 262.778 |
| 2.336 | −5.026 | 262.778 |
| 1.669 | −4.464 | 262.778 |
| 1.012 | −3.892 | 262.778 |
| 0.25556 | −3.307 | 262.778 |
| −0.264 | −2.708 | 262.778 |
| −0.883 | −2.096 | 262.778 |
| −1.490 | −1.471 | 262.778 |
| −2.082 | −0.831 | 262.778 |
| −2.659 | −0.174 | 262.778 |
| −3.219 | 0.34722 | 262.778 |
| −3.762 | 1.192 | 262.778 |
| −4.271 | 1.877 | 262.778 |
| −4.746 | 2.553 | 262.778 |
| −5.186 | 3.215 | 262.778 |
| −5.594 | 3.864 | 262.778 |
| −5.971 | 4.497 | 262.778 |
| −6.320 | 5.113 | 262.778 |
| −6.640 | 5.711 | 262.778 |
| −6.933 | 6.290 | 262.778 |
| −7.188 | 6.822 | 262.778 |
| −7.407 | 7.305 | 262.778 |
| −7.593 | 7.739 | 262.778 |
| −7.757 | 8.150 | 262.778 |
| −7.890 | 8.509 | 262.778 |
| −7.981 | 8.790 | 262.778 |
| −8.042 | 9.018 | 262.778 |
| −8.074 | 9.192 | 262.778 |
| −8.084 | 9.324 | 262.778 |
| −8.077 | 9.397 | 262.778 |
| −8.061 | 9.442 | 262.778 |
| −8.047 | 9.460 | 262.778 |
| −8.037 | 9.467 | 262.778 |
| −7.944 | 9.446 | 263.972 |
| −7.938 | 9.448 | 263.972 |
| −7.927 | 9.451 | 263.972 |
| −7.904 | 9.448 | 263.972 |
| −7.862 | 9.428 | 263.972 |
| −7.805 | 9.385 | 263.972 |
| −7.714 | 9.294 | 263.972 |
| −7.604 | 9.162 | 263.972 |
| −7.466 | 8.980 | 263.972 |
| −7.299 | 8.748 | 263.972 |
| −7.086 | 8.444 | 263.972 |
| −6.841 | 8.091 | 263.972 |
| −6.578 | 7.717 | 263.972 |
| −6.282 | 7.296 | 263.972 |
| −5.950 | 6.830 | 263.972 |
| −5.582 | 6.320 | 263.972 |
| −5.191 | 5.791 | 263.972 |
| −4.778 | 5.244 | 263.972 |
| −4.342 | 4.678 | 263.972 |
| −3.882 | 4.095 | 263.972 |
| −3.397 | 3.495 | 263.972 |
| −2.886 | 2.878 | 263.972 |
| −2.350 | 2.246 | 263.972 |
| −1.787 | 1.599 | 263.972 |
| −1.216 | 0.66597 | 263.972 |
| −0.640 | 0.225 | 263.972 |
| −0.058 | −0.306 | 263.972 |
| 0.36736 | −0.931 | 263.972 |
| 1.122 | −1.551 | 263.972 |
| 1.719 | −2.166 | 263.972 |
| 2.320 | −2.778 | 263.972 |
| 2.926 | −3.385 | 263.972 |
| 3.535 | −3.989 | 263.972 |
| 4.147 | −4.590 | 263.972 |
| 4.762 | −5.188 | 263.972 |
| 5.359 | −5.762 | 263.972 |

TABLE 1-continued

| X | Y | Z |
|---|---|---|
| 5.939 | −6.314 | 263.972 |
| 6.501 | −6.843 | 263.972 |
| 7.046 | −7.350 | 263.972 |
| 7.572 | −7.833 | 263.972 |
| 8.081 | −8.294 | 263.972 |
| 8.571 | −8.732 | 263.972 |
| 9.022 | −9.128 | 263.972 |
| 9.433 | −9.484 | 263.972 |
| 9.802 | −9.800 | 263.972 |
| 10.130 | −10.076 | 263.972 |
| 10.417 | −10.312 | 263.972 |
| 10.661 | −10.510 | 263.972 |
| 10.872 | −10.678 | 263.972 |
| 11.049 | −10.818 | 263.972 |
| 11.196 | −10.932 | 263.972 |
| 11.313 | −11.023 | 263.972 |
| 11.398 | −11.099 | 263.972 |
| 11.432 | −11.178 | 263.972 |
| 11.434 | −11.249 | 263.972 |
| 11.418 | −11.304 | 263.972 |
| 11.396 | −11.341 | 263.972 |
| 11.367 | −11.374 | 263.972 |
| 11.318 | −11.406 | 263.972 |
| 11.247 | −11.426 | 263.972 |
| 11.160 | −11.415 | 263.972 |
| 11.060 | −11.355 | 263.972 |
| 10.936 | −11.268 | 263.972 |
| 10.780 | −11.160 | 263.972 |
| 10.591 | −11.029 | 263.972 |
| 10.365 | −10.873 | 263.972 |
| 10.101 | −10.690 | 263.972 |
| 9.788 | −10.476 | 263.972 |
| 9.427 | −10.228 | 263.972 |
| 9.019 | −9.947 | 263.972 |
| 8.564 | −9.630 | 263.972 |
| 8.062 | −9.278 | 263.972 |
| 7.515 | −8.890 | 263.972 |
| 6.947 | −8.480 | 263.972 |
| 6.358 | −8.050 | 263.972 |
| 5.750 | −7.596 | 263.972 |
| 5.123 | −7.120 | 263.972 |
| 4.478 | −6.621 | 263.972 |
| 3.817 | −6.097 | 263.972 |
| 3.141 | −5.547 | 263.972 |
| 2.473 | −4.988 | 263.972 |
| 1.814 | −4.421 | 263.972 |
| 1.165 | −3.843 | 263.972 |
| 0.36597 | −3.254 | 263.972 |
| −0.099 | −2.652 | 263.972 |
| −0.712 | −2.038 | 263.972 |
| −1.313 | −1.411 | 263.972 |
| −1.901 | −0.771 | 263.972 |
| −2.475 | −0.116 | 263.972 |
| −3.032 | 0.38542 | 263.972 |
| −3.574 | 1.242 | 263.972 |
| −4.083 | 1.922 | 263.972 |
| −4.560 | 2.592 | 263.972 |
| −5.005 | 3.250 | 263.972 |
| −5.418 | 3.893 | 263.972 |
| −5.801 | 4.520 | 263.972 |
| −6.155 | 5.130 | 263.972 |
| −6.483 | 5.722 | 263.972 |
| −6.784 | 6.295 | 263.972 |
| −7.046 | 6.821 | 263.972 |
| −7.273 | 7.299 | 263.972 |
| −7.465 | 7.729 | 263.972 |
| −7.636 | 8.135 | 263.972 |
| −7.776 | 8.491 | 263.972 |
| −7.873 | 8.769 | 263.972 |
| −7.939 | 8.995 | 263.972 |
| −7.976 | 9.167 | 263.972 |
| −7.990 | 9.299 | 263.972 |
| −7.985 | 9.372 | 263.972 |
| −7.971 | 9.417 | 263.972 |
| −7.958 | 9.436 | 263.972 |
| −7.949 | 9.443 | 263.972 |
| −7.918 | 9.437 | 264.569 |

TABLE 1-continued

| X | Y | Z |
|---|---|---|
| −7.912 | 9.439 | 264.569 |
| −7.901 | 9.441 | 264.569 |
| −7.878 | 9.438 | 264.569 |
| −7.836 | 9.419 | 264.569 |
| −7.779 | 9.376 | 264.569 |
| −7.688 | 9.284 | 264.569 |
| −7.578 | 9.153 | 264.569 |
| −7.440 | 8.971 | 264.569 |
| −7.272 | 8.739 | 264.569 |
| −7.058 | 8.435 | 264.569 |
| −6.812 | 8.084 | 264.569 |
| −6.549 | 7.710 | 264.569 |
| −6.252 | 7.290 | 264.569 |
| −5.920 | 6.824 | 264.569 |
| −5.550 | 6.316 | 264.569 |
| −5.158 | 5.787 | 264.569 |
| −4.745 | 5.240 | 264.569 |
| −4.308 | 4.675 | 264.569 |
| −3.848 | 4.092 | 264.569 |
| −3.363 | 3.492 | 264.569 |
| −2.852 | 2.876 | 264.569 |
| −2.316 | 2.244 | 264.569 |
| −1.754 | 1.596 | 264.569 |
| −1.185 | 0.66319 | 264.569 |
| −0.610 | 0.22153 | 264.569 |
| −0.029 | −0.312 | 264.569 |
| 0.38611 | −0.938 | 264.569 |
| 1.147 | −1.560 | 264.569 |
| 1.743 | −2.177 | 264.569 |
| 2.343 | −2.790 | 264.569 |
| 2.946 | −3.399 | 264.569 |
| 3.553 | −4.005 | 264.569 |
| 4.164 | −4.607 | 264.569 |
| 4.777 | −5.207 | 264.569 |
| 5.373 | −5.783 | 264.569 |
| 5.951 | −6.336 | 264.569 |
| 6.511 | −6.867 | 264.569 |
| 7.054 | −7.375 | 264.569 |
| 7.579 | −7.859 | 264.569 |
| 8.086 | −8.322 | 264.569 |
| 8.575 | −8.761 | 264.569 |
| 9.025 | −9.159 | 264.569 |
| 9.434 | −9.516 | 264.569 |
| 9.802 | −9.833 | 264.569 |
| 10.129 | −10.110 | 264.569 |
| 10.415 | −10.348 | 264.569 |
| 10.659 | −10.547 | 264.569 |
| 10.868 | −10.716 | 264.569 |
| 11.045 | −10.856 | 264.569 |
| 11.191 | −10.971 | 264.569 |
| 11.308 | −11.062 | 264.569 |
| 11.391 | −11.140 | 264.569 |
| 11.424 | −11.218 | 264.569 |
| 11.425 | −11.289 | 264.569 |
| 11.408 | −11.343 | 264.569 |
| 11.387 | −11.380 | 264.569 |
| 11.357 | −11.412 | 264.569 |
| 11.308 | −11.445 | 264.569 |
| 11.238 | −11.464 | 264.569 |
| 11.151 | −11.453 | 264.569 |
| 11.051 | −11.392 | 264.569 |
| 10.927 | −11.305 | 264.569 |
| 10.772 | −11.196 | 264.569 |
| 10.584 | −11.063 | 264.569 |
| 10.360 | −10.906 | 264.569 |
| 10.097 | −10.722 | 264.569 |
| 9.786 | −10.506 | 264.569 |
| 9.427 | −10.256 | 264.569 |
| 9.021 | −9.972 | 264.569 |
| 8.569 | −9.653 | 264.569 |
| 8.070 | −9.298 | 264.569 |
| 7.526 | −8.906 | 264.569 |
| 6.961 | −8.493 | 264.569 |
| 6.376 | −8.059 | 264.569 |
| 5.771 | −7.602 | 264.569 |
| 5.148 | −7.122 | 264.569 |
| 4.507 | −6.619 | 264.569 |

TABLE 1-continued

| X | Y | Z |
|---|---|---|
| 3.850 | −6.092 | 264.569 |
| 3.177 | −5.538 | 264.569 |
| 2.513 | −4.977 | 264.569 |
| 1.858 | −4.406 | 264.569 |
| 1.212 | −3.825 | 264.569 |
| 0.40139 | −3.234 | 264.569 |
| −0.045 | −2.630 | 264.569 |
| −0.656 | −2.015 | 264.569 |
| −1.254 | −1.387 | 264.569 |
| −1.840 | −0.746 | 264.569 |
| −2.412 | −0.091 | 264.569 |
| −2.968 | 0.40208 | 264.569 |
| −3.509 | 1.265 | 264.569 |
| −4.018 | 1.942 | 264.569 |
| −4.495 | 2.610 | 264.569 |
| −4.941 | 3.266 | 264.569 |
| −5.356 | 3.906 | 264.569 |
| −5.741 | 4.531 | 264.569 |
| −6.099 | 5.138 | 264.569 |
| −6.429 | 5.727 | 264.569 |
| −6.733 | 6.298 | 264.569 |
| −6.998 | 6.822 | 264.569 |
| −7.228 | 7.298 | 264.569 |
| −7.423 | 7.725 | 264.569 |
| −7.597 | 8.130 | 264.569 |
| −7.740 | 8.484 | 264.569 |
| −7.840 | 8.761 | 264.569 |
| −7.908 | 8.985 | 264.569 |
| −7.946 | 9.157 | 264.569 |
| −7.961 | 9.289 | 264.569 |
| −7.958 | 9.362 | 264.569 |
| −7.945 | 9.407 | 264.569 |
| −7.932 | 9.426 | 264.569 |
| −7.923 | 9.434 | 264.569 |
| −7.904 | 9.427 | 265.166 |
| −7.898 | 9.430 | 265.166 |
| −7.887 | 9.432 | 265.166 |
| −7.864 | 9.429 | 265.166 |
| −7.822 | 9.410 | 265.166 |
| −7.765 | 9.367 | 265.166 |
| −7.674 | 9.276 | 265.166 |
| −7.563 | 9.144 | 265.166 |
| −7.424 | 8.963 | 265.166 |
| −7.256 | 8.732 | 265.166 |
| −7.041 | 8.429 | 265.166 |
| −6.795 | 8.078 | 265.166 |
| −6.530 | 7.705 | 265.166 |
| −6.232 | 7.285 | 265.166 |
| −5.899 | 6.821 | 265.166 |
| −5.528 | 6.313 | 265.166 |
| −5.136 | 5.786 | 265.166 |
| −4.721 | 5.240 | 265.166 |
| −4.284 | 4.675 | 265.166 |
| −3.823 | 4.093 | 265.166 |
| −3.337 | 3.493 | 265.166 |
| −2.827 | 2.877 | 265.166 |
| −2.291 | 2.245 | 265.166 |
| −1.730 | 1.597 | 265.166 |
| −1.162 | 0.66319 | 265.166 |
| −0.588 | 0.22083 | 265.166 |
| −0.009 | −0.315 | 265.166 |
| 0.39931 | −0.942 | 265.166 |
| 1.164 | −1.565 | 265.166 |
| 1.758 | −2.183 | 265.166 |
| 2.356 | −2.798 | 265.166 |
| 2.957 | −3.410 | 265.166 |
| 3.561 | −4.017 | 265.166 |
| 4.169 | −4.622 | 265.166 |
| 4.780 | −5.223 | 265.166 |
| 5.374 | −5.801 | 265.166 |
| 5.950 | −6.357 | 265.166 |
| 6.509 | −6.889 | 265.166 |
| 7.050 | −7.399 | 265.166 |
| 7.573 | −7.886 | 265.166 |
| 8.078 | −8.350 | 265.166 |
| 8.565 | −8.791 | 265.166 |
| 9.013 | −9.191 | 265.166 |

TABLE 1-continued

| X | Y | Z |
|---|---|---|
| 9.420 | −9.550 | 265.166 |
| 9.787 | −9.868 | 265.166 |
| 10.113 | −10.147 | 265.166 |
| 10.397 | −10.386 | 265.166 |
| 10.640 | −10.586 | 265.166 |
| 10.848 | −10.756 | 265.166 |
| 11.024 | −10.897 | 265.166 |
| 11.170 | −11.013 | 265.166 |
| 11.286 | −11.105 | 265.166 |
| 11.369 | −11.182 | 265.166 |
| 11.401 | −11.261 | 265.166 |
| 11.402 | −11.332 | 265.166 |
| 11.385 | −11.386 | 265.166 |
| 11.363 | −11.423 | 265.166 |
| 11.333 | −11.455 | 265.166 |
| 11.284 | −11.487 | 265.166 |
| 11.214 | −11.506 | 265.166 |
| 11.127 | −11.495 | 265.166 |
| 11.028 | −11.434 | 265.166 |
| 10.905 | −11.346 | 265.166 |
| 10.750 | −11.236 | 265.166 |
| 10.563 | −11.102 | 265.166 |
| 10.340 | −10.944 | 265.166 |
| 10.078 | −10.759 | 265.166 |
| 9.769 | −10.540 | 265.166 |
| 9.412 | −10.288 | 265.166 |
| 9.008 | −10.002 | 265.166 |
| 8.558 | −9.681 | 265.166 |
| 8.062 | −9.323 | 265.166 |
| 7.521 | −8.928 | 265.166 |
| 6.959 | −8.512 | 265.166 |
| 6.377 | −8.075 | 265.166 |
| 5.775 | −7.615 | 265.166 |
| 5.155 | −7.132 | 265.166 |
| 4.517 | −6.626 | 265.166 |
| 3.863 | −6.095 | 265.166 |
| 3.194 | −5.538 | 265.166 |
| 2.534 | −4.973 | 265.166 |
| 1.882 | −4.400 | 265.166 |
| 1.240 | −3.816 | 265.166 |
| 0.42222 | −3.222 | 265.166 |
| −0.011 | −2.617 | 265.166 |
| −0.620 | −2.000 | 265.166 |
| −1.216 | −1.371 | 265.166 |
| −1.800 | −0.729 | 265.166 |
| −2.369 | −0.074 | 265.166 |
| −2.924 | 0.41389 | 265.166 |
| −3.464 | 1.281 | 265.166 |
| −3.972 | 1.957 | 265.166 |
| −4.450 | 2.622 | 265.166 |
| −4.897 | 3.276 | 265.166 |
| −5.313 | 3.915 | 265.166 |
| −5.700 | 4.537 | 265.166 |
| −6.060 | 5.143 | 265.166 |
| −6.392 | 5.730 | 265.166 |
| −6.699 | 6.298 | 265.166 |
| −6.966 | 6.820 | 265.166 |
| −7.199 | 7.294 | 265.166 |
| −7.396 | 7.720 | 265.166 |
| −7.572 | 8.123 | 265.166 |
| −7.717 | 8.475 | 265.166 |
| −7.819 | 8.750 | 265.166 |
| −7.889 | 8.975 | 265.166 |
| −7.929 | 9.147 | 265.166 |
| −7.946 | 9.278 | 265.166 |
| −7.943 | 9.352 | 265.166 |
| −7.931 | 9.397 | 265.166 |
| −7.918 | 9.417 | 265.166 |
| −7.909 | 9.424 | 265.166 |
| −7.900 | 9.417 | 265.763 |
| −7.895 | 9.420 | 265.763 |
| −7.884 | 9.422 | 265.763 |
| −7.861 | 9.419 | 265.763 |
| −7.819 | 9.400 | 265.763 |
| −7.761 | 9.357 | 265.763 |
| −7.669 | 9.267 | 265.763 |
| −7.558 | 9.136 | 265.763 |

TABLE 1-continued

| X | Y | Z |
|---|---|---|
| −7.419 | 8.956 | 265.763 |
| −7.250 | 8.725 | 265.763 |
| −7.034 | 8.423 | 265.763 |
| −6.786 | 8.073 | 265.763 |
| −6.521 | 7.701 | 265.763 |
| −6.221 | 7.283 | 265.763 |
| −5.887 | 6.820 | 265.763 |
| −5.515 | 6.313 | 265.763 |
| −5.121 | 5.787 | 265.763 |
| −4.705 | 5.242 | 265.763 |
| −4.267 | 4.678 | 265.763 |
| −3.805 | 4.097 | 265.763 |
| −3.319 | 3.498 | 265.763 |
| −2.809 | 2.882 | 265.763 |
| −2.274 | 2.250 | 265.763 |
| −1.713 | 1.602 | 265.763 |
| −1.146 | 0.66597 | 265.763 |
| −0.574 | 0.22292 | 265.763 |
| 0.003 | −0.312 | 265.763 |
| 0.40625 | −0.941 | 265.763 |
| 1.172 | −1.565 | 265.763 |
| 1.764 | −2.186 | 265.763 |
| 2.359 | −2.802 | 265.763 |
| 2.958 | −3.416 | 265.763 |
| 3.560 | −4.026 | 265.763 |
| 4.165 | −4.633 | 265.763 |
| 4.773 | −5.237 | 265.763 |
| 5.364 | −5.817 | 265.763 |
| 5.938 | −6.375 | 265.763 |
| 6.494 | −6.909 | 265.763 |
| 7.032 | −7.421 | 265.763 |
| 7.553 | −7.910 | 265.763 |
| 8.055 | −8.377 | 265.763 |
| 8.540 | −8.820 | 265.763 |
| 8.985 | −9.222 | 265.763 |
| 9.391 | −9.583 | 265.763 |
| 9.756 | −9.903 | 265.763 |
| 10.080 | −10.184 | 265.763 |
| 10.363 | −10.424 | 265.763 |
| 10.604 | −10.626 | 265.763 |
| 10.812 | −10.796 | 265.763 |
| 10.987 | −10.939 | 265.763 |
| 11.132 | −11.055 | 265.763 |
| 11.248 | −11.148 | 265.763 |
| 11.332 | −11.225 | 265.763 |
| 11.366 | −11.305 | 265.763 |
| 11.367 | −11.377 | 265.763 |
| 11.350 | −11.433 | 265.763 |
| 11.328 | −11.470 | 265.763 |
| 11.298 | −11.503 | 265.763 |
| 11.249 | −11.534 | 265.763 |
| 11.178 | −11.553 | 265.763 |
| 11.091 | −11.541 | 265.763 |
| 10.993 | −11.480 | 265.763 |
| 10.870 | −11.391 | 265.763 |
| 10.716 | −11.281 | 265.763 |
| 10.530 | −11.146 | 265.763 |
| 10.307 | −10.986 | 265.763 |
| 10.047 | −10.800 | 265.763 |
| 9.739 | −10.580 | 265.763 |
| 9.383 | −10.327 | 265.763 |
| 8.981 | −10.038 | 265.763 |
| 8.533 | −9.714 | 265.763 |
| 8.039 | −9.354 | 265.763 |
| 7.500 | −8.957 | 265.763 |
| 6.940 | −8.538 | 265.763 |
| 6.361 | −8.098 | 265.763 |
| 5.762 | −7.635 | 265.763 |
| 5.144 | −7.149 | 265.763 |
| 4.509 | −6.640 | 265.763 |
| 3.858 | −6.106 | 265.763 |
| 3.192 | −5.547 | 265.763 |
| 2.535 | −4.979 | 265.763 |
| 1.886 | −4.402 | 265.763 |
| 1.247 | −3.816 | 265.763 |
| 0.42986 | −3.220 | 265.763 |
| 0.001 | −2.612 | 265.763 |

TABLE 1-continued

| X | Y | Z |
|---|---|---|
| −0.605 | −1.994 | 265.763 |
| −1.199 | −1.364 | 265.763 |
| −1.780 | −0.721 | 265.763 |
| −2.348 | −0.065 | 265.763 |
| −2.901 | 0.42014 | 265.763 |
| −3.440 | 1.290 | 265.763 |
| −3.947 | 1.965 | 265.763 |
| −4.424 | 2.629 | 265.763 |
| −4.872 | 3.281 | 265.763 |
| −5.290 | 3.918 | 265.763 |
| −5.678 | 4.539 | 265.763 |
| −6.039 | 5.143 | 265.763 |
| −6.374 | 5.729 | 265.763 |
| −6.682 | 6.295 | 265.763 |
| −6.951 | 6.816 | 265.763 |
| −7.185 | 7.289 | 265.763 |
| −7.385 | 7.714 | 265.763 |
| −7.563 | 8.115 | 265.763 |
| −7.709 | 8.467 | 265.763 |
| −7.812 | 8.741 | 265.763 |
| −7.883 | 8.965 | 265.763 |
| −7.924 | 9.137 | 265.763 |
| −7.941 | 9.268 | 265.763 |
| −7.939 | 9.342 | 265.763 |
| −7.927 | 9.387 | 265.763 |
| −7.914 | 9.407 | 265.763 |
| −7.905 | 9.414 | 265.763 |
| −7.906 | 9.405 | 266.360 |
| −7.901 | 9.408 | 266.360 |
| −7.889 | 9.410 | 266.360 |
| −7.866 | 9.408 | 266.360 |
| −7.824 | 9.389 | 266.360 |
| −7.766 | 9.347 | 266.360 |
| −7.674 | 9.257 | 266.360 |
| −7.562 | 9.127 | 266.360 |
| −7.421 | 8.947 | 266.360 |
| −7.251 | 8.718 | 266.360 |
| −7.034 | 8.417 | 266.360 |
| −6.785 | 8.068 | 266.360 |
| −6.518 | 7.697 | 266.360 |
| −6.217 | 7.280 | 266.360 |
| −5.880 | 6.818 | 266.360 |
| −5.507 | 6.313 | 266.360 |
| −5.111 | 5.788 | 266.360 |
| −4.694 | 5.244 | 266.360 |
| −4.255 | 4.681 | 266.360 |
| −3.792 | 4.101 | 266.360 |
| −3.306 | 3.502 | 266.360 |
| −2.795 | 2.887 | 266.360 |
| −2.260 | 2.255 | 266.360 |
| −1.699 | 1.606 | 266.360 |
| −1.134 | 0.66806 | 266.360 |
| −0.563 | 0.22431 | 266.360 |
| 0.012 | −0.312 | 266.360 |
| 0.41181 | −0.942 | 266.360 |
| 1.178 | −1.568 | 266.360 |
| 1.768 | −2.190 | 266.360 |
| 2.361 | −2.809 | 266.360 |
| 2.956 | −3.425 | 266.360 |
| 3.555 | −4.038 | 266.360 |
| 4.158 | −4.648 | 266.360 |
| 4.763 | −5.254 | 266.360 |
| 5.351 | −5.838 | 266.360 |
| 5.922 | −6.398 | 266.360 |
| 6.475 | −6.936 | 266.360 |
| 7.011 | −7.450 | 266.360 |
| 7.529 | −7.942 | 266.360 |
| 8.029 | −8.411 | 266.360 |
| 8.511 | −8.858 | 266.360 |
| 8.954 | −9.262 | 266.360 |
| 9.357 | −9.625 | 266.360 |
| 9.721 | −9.948 | 266.360 |
| 10.043 | −10.230 | 266.360 |
| 10.324 | −10.473 | 266.360 |
| 10.564 | −10.675 | 266.360 |
| 10.771 | −10.847 | 266.360 |
| 10.945 | −10.991 | 266.360 |

TABLE 1-continued

| X | Y | Z |
|---|---|---|
| 11.089 | −11.108 | 266.360 |
| 11.205 | −11.201 | 266.360 |
| 11.288 | −11.279 | 266.360 |
| 11.321 | −11.359 | 266.360 |
| 11.322 | −11.431 | 266.360 |
| 11.305 | −11.486 | 266.360 |
| 11.283 | −11.524 | 266.360 |
| 11.252 | −11.556 | 266.360 |
| 11.203 | −11.588 | 266.360 |
| 11.133 | −11.606 | 266.360 |
| 11.046 | −11.594 | 266.360 |
| 10.947 | −11.532 | 266.360 |
| 10.825 | −11.443 | 266.360 |
| 10.672 | −11.331 | 266.360 |
| 10.486 | −11.196 | 266.360 |
| 10.265 | −11.035 | 266.360 |
| 10.005 | −10.848 | 266.360 |
| 9.698 | −10.627 | 266.360 |
| 9.344 | −10.371 | 266.360 |
| 8.943 | −10.081 | 266.360 |
| 8.496 | −9.755 | 266.360 |
| 8.004 | −9.393 | 266.360 |
| 7.467 | −8.993 | 266.360 |
| 6.909 | −8.573 | 266.360 |
| 6.332 | −8.130 | 266.360 |
| 5.735 | −7.665 | 266.360 |
| 5.119 | −7.176 | 266.360 |
| 4.487 | −6.664 | 266.360 |
| 3.838 | −6.128 | 266.360 |
| 3.175 | −5.565 | 266.360 |
| 2.520 | −4.995 | 266.360 |
| 1.874 | −4.415 | 266.360 |
| 1.237 | −3.827 | 266.360 |
| 0.42431 | −3.228 | 266.360 |
| −0.004 | −2.618 | 266.360 |
| −0.607 | −1.998 | 266.360 |
| −1.199 | −1.366 | 266.360 |
| −1.779 | −0.722 | 266.360 |
| −2.344 | −0.065 | 266.360 |
| −2.896 | 0.42083 | 266.360 |
| −3.434 | 1.290 | 266.360 |
| −3.940 | 1.964 | 266.360 |
| −4.417 | 2.628 | 266.360 |
| −4.864 | 3.279 | 266.360 |
| −5.282 | 3.915 | 266.360 |
| −5.672 | 4.535 | 266.360 |
| −6.034 | 5.138 | 266.360 |
| −6.370 | 5.723 | 266.360 |
| −6.679 | 6.288 | 266.360 |
| −6.950 | 6.808 | 266.360 |
| −7.186 | 7.280 | 266.360 |
| −7.386 | 7.704 | 266.360 |
| −7.565 | 8.105 | 266.360 |
| −7.712 | 8.456 | 266.360 |
| −7.816 | 8.730 | 266.360 |
| −7.888 | 8.954 | 266.360 |
| −7.929 | 9.125 | 266.360 |
| −7.947 | 9.256 | 266.360 |
| −7.945 | 9.330 | 266.360 |
| −7.933 | 9.375 | 266.360 |
| −7.920 | 9.395 | 266.360 |
| −7.911 | 9.402 | 266.360 |
| −7.918 | 9.391 | 266.957 |
| −7.913 | 9.393 | 266.957 |
| −7.902 | 9.396 | 266.957 |
| −7.878 | 9.394 | 266.957 |
| −7.836 | 9.376 | 266.957 |
| −7.778 | 9.334 | 266.957 |
| −7.684 | 9.245 | 266.957 |
| −7.571 | 9.116 | 266.957 |
| −7.430 | 8.937 | 266.957 |
| −7.258 | 8.709 | 266.957 |
| −7.039 | 8.409 | 266.957 |
| −6.788 | 8.062 | 266.957 |
| −6.520 | 7.692 | 266.957 |
| −6.217 | 7.276 | 266.957 |
| −5.879 | 6.816 | 266.957 |

TABLE 1-continued

| X | Y | Z |
|---|---|---|
| −5.503 | 6.312 | 266.957 |
| −5.106 | 5.788 | 266.957 |
| −4.688 | 5.245 | 266.957 |
| −4.247 | 4.683 | 266.957 |
| −3.783 | 4.104 | 266.957 |
| −3.295 | 3.506 | 266.957 |
| −2.784 | 2.891 | 266.957 |
| −2.249 | 2.259 | 266.957 |
| −1.689 | 1.610 | 266.957 |
| −1.125 | 0.67014 | 266.957 |
| −0.555 | 0.22569 | 266.957 |
| 0.019 | −0.312 | 266.957 |
| 0.41528 | −0.944 | 266.957 |
| 1.181 | −1.572 | 266.957 |
| 1.768 | −2.196 | 266.957 |
| 2.359 | −2.818 | 266.957 |
| 2.951 | −3.436 | 266.957 |
| 3.547 | −4.052 | 266.957 |
| 4.147 | −4.665 | 266.957 |
| 4.749 | −5.275 | 266.957 |
| 5.334 | −5.862 | 266.957 |
| 5.901 | −6.425 | 266.957 |
| 6.451 | −6.966 | 266.957 |
| 6.984 | −7.484 | 266.957 |
| 7.499 | −7.979 | 266.957 |
| 7.996 | −8.451 | 266.957 |
| 8.475 | −8.900 | 266.957 |
| 8.916 | −9.308 | 266.957 |
| 9.317 | −9.674 | 266.957 |
| 9.678 | −9.999 | 266.957 |
| 9.998 | −10.283 | 266.957 |
| 10.278 | −10.527 | 266.957 |
| 10.517 | −10.731 | 266.957 |
| 10.722 | −10.905 | 266.957 |
| 10.896 | −11.049 | 266.957 |
| 11.039 | −11.167 | 266.957 |
| 11.154 | −11.261 | 266.957 |
| 11.237 | −11.339 | 266.957 |
| 11.270 | −11.419 | 266.957 |
| 11.270 | −11.492 | 266.957 |
| 11.253 | −11.547 | 266.957 |
| 11.230 | −11.585 | 266.957 |
| 11.200 | −11.617 | 266.957 |
| 11.150 | −11.648 | 266.957 |
| 11.080 | −11.666 | 266.957 |
| 10.993 | −11.654 | 266.957 |
| 10.895 | −11.591 | 266.957 |
| 10.773 | −11.501 | 266.957 |
| 10.620 | −11.389 | 266.957 |
| 10.435 | −11.253 | 266.957 |
| 10.214 | −11.092 | 266.957 |
| 9.955 | −10.903 | 266.957 |
| 9.649 | −10.681 | 266.957 |
| 9.296 | −10.424 | 266.957 |
| 8.896 | −10.132 | 266.957 |
| 8.450 | −9.805 | 266.957 |
| 7.959 | −9.441 | 266.957 |
| 7.423 | −9.039 | 266.957 |
| 6.867 | −8.616 | 266.957 |
| 6.291 | −8.172 | 266.957 |
| 5.696 | −7.704 | 266.957 |
| 5.082 | −7.213 | 266.957 |
| 4.451 | −6.699 | 266.957 |
| 3.804 | −6.160 | 266.957 |
| 3.143 | −5.595 | 266.957 |
| 2.490 | −5.021 | 266.957 |
| 1.846 | −4.439 | 266.957 |
| 1.212 | −3.848 | 266.957 |
| 0.40903 | −3.247 | 266.957 |
| −0.024 | −2.636 | 266.957 |
| −0.626 | −2.013 | 266.957 |
| −1.215 | −1.380 | 266.957 |
| −1.793 | −0.734 | 266.957 |
| −2.357 | −0.076 | 266.957 |
| −2.907 | 0.41389 | 266.957 |
| −3.443 | 1.281 | 266.957 |
| −3.948 | 1.955 | 266.957 |

TABLE 1-continued

| X | Y | Z |
|---|---|---|
| −4.424 | 2.618 | 266.957 |
| −4.871 | 3.268 | 266.957 |
| −5.290 | 3.905 | 266.957 |
| −5.680 | 4.524 | 266.957 |
| −6.042 | 5.127 | 266.957 |
| −6.379 | 5.711 | 266.957 |
| −6.689 | 6.276 | 266.957 |
| −6.961 | 6.795 | 266.957 |
| −7.196 | 7.267 | 266.957 |
| −7.397 | 7.690 | 266.957 |
| −7.577 | 8.091 | 266.957 |
| −7.725 | 8.442 | 266.957 |
| −7.828 | 8.716 | 266.957 |
| −7.900 | 8.939 | 266.957 |
| −7.942 | 9.111 | 266.957 |
| −7.960 | 9.242 | 266.957 |
| −7.958 | 9.315 | 266.957 |
| −7.945 | 9.361 | 266.957 |
| −7.932 | 9.380 | 266.957 |
| −7.923 | 9.388 | 266.957 |
| −8.048 | 9.150 | 271.165 |
| −8.043 | 9.153 | 271.165 |
| −8.032 | 9.156 | 271.165 |
| −8.008 | 9.157 | 271.165 |
| −7.964 | 9.144 | 271.165 |
| −7.902 | 9.108 | 271.165 |
| −7.802 | 9.026 | 271.165 |
| −7.682 | 8.903 | 271.165 |
| −7.531 | 8.731 | 271.165 |
| −7.350 | 8.510 | 271.165 |
| −7.121 | 8.216 | 271.165 |
| −6.859 | 7.876 | 271.165 |
| −6.580 | 7.513 | 271.165 |
| −6.267 | 7.103 | 271.165 |
| −5.920 | 6.648 | 271.165 |
| −5.535 | 6.150 | 271.165 |
| −5.131 | 5.630 | 271.165 |
| −4.706 | 5.090 | 271.165 |
| −4.261 | 4.530 | 271.165 |
| −3.794 | 3.950 | 271.165 |
| −3.306 | 3.351 | 271.165 |
| −2.796 | 2.733 | 271.165 |
| −2.264 | 2.095 | 271.165 |
| −1.710 | 1.439 | 271.165 |
| −1.152 | 0.54583 | 271.165 |
| −0.592 | 0.09375 | 271.165 |
| −0.030 | −0.515 | 271.165 |
| 0.37083 | −1.162 | 271.165 |
| 1.101 | −1.807 | 271.165 |
| 1.670 | −2.450 | 271.165 |
| 2.240 | −3.093 | 271.165 |
| 2.812 | −3.733 | 271.165 |
| 3.385 | −4.373 | 271.165 |
| 3.961 | −5.010 | 271.165 |
| 4.539 | −5.645 | 271.165 |
| 5.100 | −6.257 | 271.165 |
| 5.644 | −6.845 | 271.165 |
| 6.172 | −7.410 | 271.165 |
| 6.683 | −7.951 | 271.165 |
| 7.177 | −8.469 | 271.165 |
| 7.654 | −8.963 | 271.165 |
| 8.115 | −9.433 | 271.165 |
| 8.539 | −9.860 | 271.165 |
| 8.925 | −10.243 | 271.165 |
| 9.274 | −10.583 | 271.165 |
| 9.583 | −10.880 | 271.165 |
| 9.854 | −11.136 | 271.165 |
| 10.085 | −11.349 | 271.165 |
| 10.284 | −11.530 | 271.165 |
| 10.453 | −11.681 | 271.165 |
| 10.592 | −11.805 | 271.165 |
| 10.704 | −11.903 | 271.165 |
| 10.784 | −11.984 | 271.165 |
| 10.815 | −12.066 | 271.165 |
| 10.813 | −12.138 | 271.165 |
| 10.794 | −12.193 | 271.165 |
| 10.770 | −12.230 | 271.165 |

TABLE 1-continued

| X | Y | Z |
|---|---|---|
| 10.739 | −12.261 | 271.165 |
| 10.689 | −12.292 | 271.165 |
| 10.617 | −12.308 | 271.165 |
| 10.531 | −12.293 | 271.165 |
| 10.434 | −12.227 | 271.165 |
| 10.314 | −12.134 | 271.165 |
| 10.165 | −12.018 | 271.165 |
| 9.982 | −11.876 | 271.165 |
| 9.765 | −11.709 | 271.165 |
| 9.510 | −11.513 | 271.165 |
| 9.208 | −11.283 | 271.165 |
| 8.860 | −11.018 | 271.165 |
| 8.465 | −10.717 | 271.165 |
| 8.025 | −10.380 | 271.165 |
| 7.540 | −10.004 | 271.165 |
| 7.012 | −9.590 | 271.165 |
| 6.463 | −9.155 | 271.165 |
| 5.894 | −8.698 | 271.165 |
| 5.307 | −8.217 | 271.165 |
| 4.702 | −7.713 | 271.165 |
| 4.080 | −7.184 | 271.165 |
| 3.443 | −6.630 | 271.165 |
| 2.793 | −6.049 | 271.165 |
| 2.151 | −5.461 | 271.165 |
| 1.518 | −4.864 | 271.165 |
| 0.62153 | −4.258 | 271.165 |
| 0.19583 | −3.642 | 271.165 |
| −0.319 | −3.016 | 271.165 |
| −0.909 | −2.380 | 271.165 |
| −1.488 | −1.733 | 271.165 |
| −2.055 | −1.076 | 271.165 |
| −2.609 | −0.406 | 271.165 |
| −3.149 | 0.19236 | 271.165 |
| −3.676 | 0.67431 | 271.165 |
| −4.173 | 1.654 | 271.165 |
| −4.640 | 2.325 | 271.165 |
| −5.079 | 2.982 | 271.165 |
| −5.491 | 3.625 | 271.165 |
| −5.875 | 4.250 | 271.165 |
| −6.232 | 4.858 | 271.165 |
| −6.563 | 5.446 | 271.165 |
| −6.868 | 6.015 | 271.165 |
| −7.136 | 6.538 | 271.165 |
| −7.367 | 7.013 | 271.165 |
| −7.564 | 7.440 | 271.165 |
| −7.739 | 7.844 | 271.165 |
| −7.883 | 8.197 | 271.165 |
| −7.983 | 8.473 | 271.165 |
| −8.050 | 8.698 | 271.165 |
| −8.088 | 8.871 | 271.165 |
| −8.100 | 9.003 | 271.165 |
| −8.093 | 9.077 | 271.165 |
| −8.077 | 9.121 | 271.165 |
| −8.062 | 9.140 | 271.165 |
| −8.053 | 9.147 | 271.165 |
| −8.158 | 8.724 | 275.374 |
| −8.153 | 8.727 | 275.374 |
| −8.141 | 8.729 | 275.374 |
| −8.118 | 8.727 | 275.374 |
| −8.075 | 8.708 | 275.374 |
| −8.017 | 8.665 | 275.374 |
| −7.923 | 8.575 | 275.374 |
| −7.809 | 8.444 | 275.374 |
| −7.666 | 8.263 | 275.374 |
| −7.493 | 8.033 | 275.374 |
| −7.272 | 7.729 | 275.374 |
| −7.020 | 7.378 | 275.374 |
| −6.749 | 7.003 | 275.374 |
| −6.446 | 6.582 | 275.374 |
| −6.108 | 6.114 | 275.374 |
| −5.734 | 5.600 | 275.374 |
| −5.340 | 5.066 | 275.374 |
| −4.927 | 4.510 | 275.374 |
| −4.493 | 3.933 | 275.374 |
| −4.038 | 3.337 | 275.374 |
| −3.562 | 2.720 | 275.374 |
| −3.064 | 2.084 | 275.374 |

TABLE 1-continued

| X | Y | Z |
|---|---|---|
| −2.544 | 1.428 | 275.374 |
| −2.001 | 0.52292 | 275.374 |
| −1.456 | 0.081 | 275.374 |
| −0.907 | −0.589 | 275.374 |
| −0.355 | −1.256 | 275.374 |
| 0.13889 | −1.921 | 275.374 |
| 0.52639 | −2.583 | 275.374 |
| 1.319 | −3.243 | 275.374 |
| 1.882 | −3.900 | 275.374 |
| 2.448 | −4.555 | 275.374 |
| 3.018 | −5.207 | 275.374 |
| 3.590 | −5.857 | 275.374 |
| 4.166 | −6.503 | 275.374 |
| 4.727 | −7.125 | 275.374 |
| 5.272 | −7.721 | 275.374 |
| 5.800 | −8.294 | 275.374 |
| 6.313 | −8.842 | 275.374 |
| 6.809 | −9.366 | 275.374 |
| 7.288 | −9.866 | 275.374 |
| 7.750 | −10.343 | 275.374 |
| 8.175 | −10.775 | 275.374 |
| 8.562 | −11.163 | 275.374 |
| 8.911 | −11.509 | 275.374 |
| 9.220 | −11.812 | 275.374 |
| 9.490 | −12.072 | 275.374 |
| 9.721 | −12.291 | 275.374 |
| 9.919 | −12.476 | 275.374 |
| 10.086 | −12.631 | 275.374 |
| 10.224 | −12.758 | 275.374 |
| 10.335 | −12.859 | 275.374 |
| 10.414 | −12.942 | 275.374 |
| 10.444 | −13.025 | 275.374 |
| 10.442 | −13.098 | 275.374 |
| 10.422 | −13.153 | 275.374 |
| 10.397 | −13.190 | 275.374 |
| 10.365 | −13.220 | 275.374 |
| 10.313 | −13.249 | 275.374 |
| 10.241 | −13.263 | 275.374 |
| 10.155 | −13.244 | 275.374 |
| 10.061 | −13.175 | 275.374 |
| 9.943 | −13.078 | 275.374 |
| 9.797 | −12.956 | 275.374 |
| 9.619 | −12.808 | 275.374 |
| 9.407 | −12.632 | 275.374 |
| 9.158 | −12.427 | 275.374 |
| 8.864 | −12.185 | 275.374 |
| 8.525 | −11.906 | 275.374 |
| 8.140 | −11.589 | 275.374 |
| 7.712 | −11.234 | 275.374 |
| 7.241 | −10.838 | 275.374 |
| 6.727 | −10.402 | 275.374 |
| 6.194 | −9.944 | 275.374 |
| 5.643 | −9.462 | 275.374 |
| 5.075 | −8.956 | 275.374 |
| 4.490 | −8.426 | 275.374 |
| 3.890 | −7.870 | 275.374 |
| 3.276 | −7.289 | 275.374 |
| 2.648 | −6.680 | 275.374 |
| 2.028 | −6.064 | 275.374 |
| 1.417 | −5.440 | 275.374 |
| 0.56528 | −4.808 | 275.374 |
| 0.15417 | −4.168 | 275.374 |
| −0.362 | −3.518 | 275.374 |
| −0.935 | −2.860 | 275.374 |
| −1.499 | −2.194 | 275.374 |
| −2.054 | −1.518 | 275.374 |
| −2.597 | −0.833 | 275.374 |
| −3.129 | −0.138 | 275.374 |
| −3.651 | 0.39444 | 275.374 |
| −4.144 | 1.259 | 275.374 |
| −4.610 | 1.936 | 275.374 |
| −5.050 | 2.597 | 275.374 |
| −5.462 | 3.240 | 275.374 |
| −5.849 | 3.864 | 275.374 |
| −6.211 | 4.470 | 275.374 |
| −6.548 | 5.056 | 275.374 |
| −6.862 | 5.621 | 275.374 |

TABLE 1-continued

| X | Y | Z |
|---|---|---|
| −7.139 | 6.140 | 275.374 |
| −7.380 | 6.610 | 275.374 |
| −7.588 | 7.032 | 275.374 |
| −7.776 | 7.431 | 275.374 |
| −7.932 | 7.780 | 275.374 |
| −8.044 | 8.052 | 275.374 |
| −8.122 | 8.273 | 275.374 |
| −8.170 | 8.443 | 275.374 |
| −8.192 | 8.574 | 275.374 |
| −8.194 | 8.647 | 275.374 |
| −8.184 | 8.693 | 275.374 |
| −8.172 | 8.713 | 275.374 |
| −8.163 | 8.721 | 275.374 |
| −8.263 | 8.345 | 279.583 |
| −8.257 | 8.348 | 279.583 |
| −8.245 | 8.350 | 279.583 |
| −8.222 | 8.348 | 279.583 |
| −8.178 | 8.329 | 279.583 |
| −8.117 | 8.286 | 279.583 |
| −8.021 | 8.194 | 279.583 |
| −7.904 | 8.061 | 279.583 |
| −7.757 | 7.876 | 279.583 |
| −7.579 | 7.639 | 279.583 |
| −7.353 | 7.328 | 279.583 |
| −7.095 | 6.968 | 279.583 |
| −6.819 | 6.583 | 279.583 |
| −6.510 | 6.150 | 279.583 |
| −6.166 | 5.668 | 279.583 |
| −5.787 | 5.139 | 279.583 |
| −5.390 | 4.587 | 279.583 |
| −4.973 | 4.013 | 279.583 |
| −4.537 | 3.416 | 279.583 |
| −4.080 | 2.797 | 279.583 |
| −3.603 | 2.157 | 279.583 |
| −3.104 | 1.497 | 279.583 |
| −2.583 | 0.56597 | 279.583 |
| −2.041 | 0.07847 | 279.583 |
| −1.496 | −0.587 | 279.583 |
| −0.948 | −1.285 | 279.583 |
| −0.399 | −1.982 | 279.583 |
| 0.10625 | −2.677 | 279.583 |
| 0.49236 | −3.369 | 279.583 |
| 1.266 | −4.059 | 279.583 |
| 1.826 | −4.747 | 279.583 |
| 2.389 | −5.433 | 279.583 |
| 2.954 | −6.117 | 279.583 |
| 3.524 | −6.797 | 279.583 |
| 4.097 | −7.474 | 279.583 |
| 4.655 | −8.125 | 279.583 |
| 5.198 | −8.751 | 279.583 |
| 5.724 | −9.351 | 279.583 |
| 6.235 | −9.926 | 279.583 |
| 6.729 | −10.476 | 279.583 |
| 7.207 | −11.001 | 279.583 |
| 7.668 | −11.501 | 279.583 |
| 8.092 | −11.955 | 279.583 |
| 8.478 | −12.363 | 279.583 |
| 8.826 | −12.727 | 279.583 |
| 9.134 | −13.045 | 279.583 |
| 9.404 | −13.319 | 279.583 |
| 9.634 | −13.549 | 279.583 |
| 9.832 | −13.744 | 279.583 |
| 10.000 | −13.907 | 279.583 |
| 10.138 | −14.041 | 279.583 |
| 10.249 | −14.147 | 279.583 |
| 10.330 | −14.233 | 279.583 |
| 10.360 | −14.317 | 279.583 |
| 10.358 | −14.392 | 279.583 |
| 10.336 | −14.448 | 279.583 |
| 10.310 | −14.486 | 279.583 |
| 10.277 | −14.516 | 279.583 |
| 10.223 | −14.544 | 279.583 |
| 10.149 | −14.555 | 279.583 |
| 10.061 | −14.531 | 279.583 |
| 9.967 | −14.457 | 279.583 |
| 9.850 | −14.354 | 279.583 |
| 9.703 | −14.226 | 279.583 |

TABLE 1-continued

| X | Y | Z |
|---|---|---|
| 9.524 | −14.071 | 279.583 |
| 9.311 | −13.886 | 279.583 |
| 9.061 | −13.671 | 279.583 |
| 8.765 | −13.417 | 279.583 |
| 8.424 | −13.123 | 279.583 |
| 8.038 | −12.790 | 279.583 |
| 7.608 | −12.417 | 279.583 |
| 7.135 | −12.001 | 279.583 |
| 6.618 | −11.544 | 279.583 |
| 6.083 | −11.063 | 279.583 |
| 5.529 | −10.558 | 279.583 |
| 4.959 | −10.028 | 279.583 |
| 4.372 | −9.473 | 279.583 |
| 3.771 | −8.891 | 279.583 |
| 3.155 | −8.282 | 279.583 |
| 2.526 | −7.644 | 279.583 |
| 1.906 | −6.998 | 279.583 |
| 1.295 | −6.344 | 279.583 |
| 0.48125 | −5.682 | 279.583 |
| 0.07014 | −5.011 | 279.583 |
| −0.481 | −4.331 | 279.583 |
| −1.053 | −3.642 | 279.583 |
| −1.615 | −2.944 | 279.583 |
| −2.168 | −2.238 | 279.583 |
| −2.709 | −1.521 | 279.583 |
| −3.241 | −0.796 | 279.583 |
| −3.761 | −0.060 | 279.583 |
| −4.254 | 0.45694 | 279.583 |
| −4.718 | 1.360 | 279.583 |
| −5.155 | 2.043 | 279.583 |
| −5.565 | 2.708 | 279.583 |
| −5.950 | 3.353 | 279.583 |
| −6.311 | 3.978 | 279.583 |
| −6.648 | 4.581 | 279.583 |
| −6.962 | 5.163 | 279.583 |
| −7.240 | 5.696 | 279.583 |
| −7.483 | 6.179 | 279.583 |
| −7.691 | 6.612 | 279.583 |
| −7.880 | 7.021 | 279.583 |
| −8.038 | 7.379 | 279.583 |
| −8.151 | 7.657 | 279.583 |
| −8.231 | 7.884 | 279.583 |
| −8.278 | 8.058 | 279.583 |
| −8.300 | 8.192 | 279.583 |
| −8.300 | 8.267 | 279.583 |
| −8.289 | 8.313 | 279.583 |
| −8.277 | 8.334 | 279.583 |
| −8.268 | 8.342 | 279.583 |
| −8.384 | 8.472 | 283.792 |
| −8.378 | 8.475 | 283.792 |
| −8.366 | 8.477 | 283.792 |
| −8.341 | 8.475 | 283.792 |
| −8.296 | 8.454 | 283.792 |
| −8.235 | 8.408 | 283.792 |
| −8.138 | 8.310 | 283.792 |
| −8.020 | 8.170 | 283.792 |
| −7.872 | 7.976 | 283.792 |
| −7.692 | 7.728 | 283.792 |
| −7.465 | 7.402 | 283.792 |
| −7.205 | 7.025 | 283.792 |
| −6.929 | 6.622 | 283.792 |
| −6.619 | 6.167 | 283.792 |
| −6.276 | 5.661 | 283.792 |
| −5.898 | 5.105 | 283.792 |
| −5.502 | 4.525 | 283.792 |
| −5.087 | 3.920 | 283.792 |
| −4.653 | 3.292 | 283.792 |
| −4.198 | 2.640 | 283.792 |
| −3.722 | 1.966 | 283.792 |
| −3.225 | 1.269 | 283.792 |
| −2.707 | 0.38194 | 283.792 |
| −2.167 | −0.191 | 283.792 |
| −1.625 | −0.929 | 283.792 |
| −1.079 | −1.666 | 283.792 |
| −0.530 | −2.400 | 283.792 |
| 0.022 | −3.132 | 283.792 |
| 0.40069 | −3.862 | 283.792 |

TABLE 1-continued

| X | Y | Z |
|---|---|---|
| 1.136 | −4.588 | 283.792 |
| 1.697 | −5.313 | 283.792 |
| 2.261 | −6.036 | 283.792 |
| 2.829 | −6.756 | 283.792 |
| 3.399 | −7.473 | 283.792 |
| 3.974 | −8.188 | 283.792 |
| 4.532 | −8.876 | 283.792 |
| 5.075 | −9.537 | 283.792 |
| 5.602 | −10.172 | 283.792 |
| 6.113 | −10.781 | 283.792 |
| 6.607 | −11.363 | 283.792 |
| 7.085 | −11.920 | 283.792 |
| 7.546 | −12.450 | 283.792 |
| 7.970 | −12.932 | 283.792 |
| 8.356 | −13.365 | 283.792 |
| 8.705 | −13.751 | 283.792 |
| 9.014 | −14.089 | 283.792 |
| 9.285 | −14.380 | 283.792 |
| 9.516 | −14.624 | 283.792 |
| 9.715 | −14.831 | 283.792 |
| 9.884 | −15.004 | 283.792 |
| 10.023 | −15.145 | 283.792 |
| 10.135 | −15.258 | 283.792 |
| 10.217 | −15.348 | 283.792 |
| 10.249 | −15.434 | 283.792 |
| 10.245 | −15.510 | 283.792 |
| 10.223 | −15.567 | 283.792 |
| 10.196 | −15.605 | 283.792 |
| 10.160 | −15.635 | 283.792 |
| 10.104 | −15.662 | 283.792 |
| 10.027 | −15.670 | 283.792 |
| 9.938 | −15.641 | 283.792 |
| 9.843 | −15.561 | 283.792 |
| 9.724 | −15.453 | 283.792 |
| 9.574 | −15.319 | 283.792 |
| 9.391 | −15.155 | 283.792 |
| 9.174 | −14.961 | 283.792 |
| 8.919 | −14.734 | 283.792 |
| 8.617 | −14.467 | 283.792 |
| 8.269 | −14.158 | 283.792 |
| 7.876 | −13.807 | 283.792 |
| 7.438 | −13.412 | 283.792 |
| 6.957 | −12.974 | 283.792 |
| 6.433 | −12.490 | 283.792 |
| 5.891 | −11.981 | 283.792 |
| 5.331 | −11.445 | 283.792 |
| 4.755 | −10.883 | 283.792 |
| 4.164 | −10.293 | 283.792 |
| 3.558 | −9.675 | 283.792 |
| 2.940 | −9.028 | 283.792 |
| 2.310 | −8.351 | 283.792 |
| 1.689 | −7.666 | 283.792 |
| 1.079 | −6.972 | 283.792 |
| 0.33264 | −6.270 | 283.792 |
| −0.110 | −5.558 | 283.792 |
| −0.689 | −4.837 | 283.792 |
| −1.256 | −4.108 | 283.792 |
| −1.813 | −3.369 | 283.792 |
| −2.359 | −2.621 | 283.792 |
| −2.893 | −1.864 | 283.792 |
| −3.417 | −1.098 | 283.792 |
| −3.931 | −0.324 | 283.792 |
| −4.416 | 0.30139 | 283.792 |
| −4.875 | 1.173 | 283.792 |
| −5.307 | 1.891 | 283.792 |
| −5.713 | 2.589 | 283.792 |
| −6.093 | 3.265 | 283.792 |
| −6.450 | 3.920 | 283.792 |
| −6.784 | 4.551 | 283.792 |
| −7.094 | 5.160 | 283.792 |
| −7.370 | 5.716 | 283.792 |
| −7.611 | 6.221 | 283.792 |
| −7.818 | 6.672 | 283.792 |
| −8.006 | 7.099 | 283.792 |
| −8.163 | 7.471 | 283.792 |
| −8.276 | 7.760 | 283.792 |
| −8.355 | 7.995 | 283.792 |

TABLE 1-continued

| X | Y | Z |
|---|---|---|
| −8.402 | 8.176 | 283.792 |
| −8.423 | 8.314 | 283.792 |
| −8.423 | 8.391 | 283.792 |
| −8.411 | 8.440 | 283.792 |
| −8.398 | 8.461 | 283.792 |
| −8.389 | 8.469 | 283.792 |
| −8.429 | 8.614 | 285.054 |
| −8.423 | 8.617 | 285.054 |
| −8.411 | 8.620 | 285.054 |
| −8.386 | 8.617 | 285.054 |
| −8.340 | 8.597 | 285.054 |
| −8.278 | 8.550 | 285.054 |
| −8.179 | 8.452 | 285.054 |
| −8.061 | 8.309 | 285.054 |
| −7.911 | 8.113 | 285.054 |
| −7.730 | 7.862 | 285.054 |
| −7.502 | 7.532 | 285.054 |
| −7.241 | 7.148 | 285.054 |
| −6.964 | 6.739 | 285.054 |
| −6.654 | 6.277 | 285.054 |
| −6.311 | 5.764 | 285.054 |
| −5.932 | 5.199 | 285.054 |
| −5.535 | 4.609 | 285.054 |
| −5.120 | 3.995 | 285.054 |
| −4.685 | 3.357 | 285.054 |
| −4.230 | 2.695 | 285.054 |
| −3.755 | 2.009 | 285.054 |
| −3.259 | 1.300 | 285.054 |
| −2.741 | 0.39514 | 285.054 |
| −2.202 | −0.185 | 285.054 |
| −1.660 | −0.937 | 285.054 |
| −1.113 | −1.686 | 285.054 |
| −0.565 | −2.433 | 285.054 |
| −0.013 | −3.177 | 285.054 |
| 0.37639 | −3.920 | 285.054 |
| 1.100 | −4.660 | 285.054 |
| 1.661 | −5.398 | 285.054 |
| 2.224 | −6.135 | 285.054 |
| 2.789 | −6.869 | 285.054 |
| 3.358 | −7.601 | 285.054 |
| 3.931 | −8.330 | 285.054 |
| 4.487 | −9.032 | 285.054 |
| 5.028 | −9.707 | 285.054 |
| 5.553 | −10.356 | 285.054 |
| 6.062 | −10.977 | 285.054 |
| 6.555 | −11.572 | 285.054 |
| 7.031 | −12.141 | 285.054 |
| 7.490 | −12.683 | 285.054 |
| 7.914 | −13.175 | 285.054 |
| 8.299 | −13.617 | 285.054 |
| 8.647 | −14.011 | 285.054 |
| 8.956 | −14.356 | 285.054 |
| 9.227 | −14.653 | 285.054 |
| 9.458 | −14.902 | 285.054 |
| 9.658 | −15.113 | 285.054 |
| 9.827 | −15.289 | 285.054 |
| 9.966 | −15.434 | 285.054 |
| 10.079 | −15.549 | 285.054 |
| 10.162 | −15.639 | 285.054 |
| 10.196 | −15.727 | 285.054 |
| 10.192 | −15.805 | 285.054 |
| 10.170 | −15.863 | 285.054 |
| 10.142 | −15.901 | 285.054 |
| 10.106 | −15.932 | 285.054 |
| 10.048 | −15.959 | 285.054 |
| 9.970 | −15.966 | 285.054 |
| 9.881 | −15.935 | 285.054 |
| 9.786 | −15.853 | 285.054 |
| 9.664 | −15.743 | 285.054 |
| 9.513 | −15.607 | 285.054 |
| 9.328 | −15.441 | 285.054 |
| 9.109 | −15.243 | 285.054 |
| 8.851 | −15.013 | 285.054 |
| 8.546 | −14.742 | 285.054 |
| 8.194 | −14.429 | 285.054 |
| 7.796 | −14.072 | 285.054 |
| 7.353 | −13.672 | 285.054 |

TABLE 1-continued

| X | Y | Z |
|---|---|---|
| 6.866 | −13.227 | 285.054 |
| 6.336 | −12.736 | 285.054 |
| 5.788 | −12.219 | 285.054 |
| 5.222 | −11.675 | 285.054 |
| 4.640 | −11.104 | 285.054 |
| 4.043 | −10.504 | 285.054 |
| 3.433 | −9.876 | 285.054 |
| 2.811 | −9.217 | 285.054 |
| 2.177 | −8.528 | 285.054 |
| 1.554 | −7.831 | 285.054 |
| 0.65417 | −7.124 | 285.054 |
| 0.23681 | −6.409 | 285.054 |
| −0.249 | −5.684 | 285.054 |
| −0.826 | −4.950 | 285.054 |
| −1.392 | −4.208 | 285.054 |
| −1.948 | −3.456 | 285.054 |
| −2.491 | −2.695 | 285.054 |
| −3.023 | −1.924 | 285.054 |
| −3.543 | −1.144 | 285.054 |
| −4.051 | −0.355 | 285.054 |
| −4.532 | 0.28889 | 285.054 |
| −4.986 | 1.170 | 285.054 |
| −5.413 | 1.903 | 285.054 |
| −5.815 | 2.616 | 285.054 |
| −6.191 | 3.306 | 285.054 |
| −6.544 | 3.974 | 285.054 |
| −6.873 | 4.618 | 285.054 |
| −7.179 | 5.239 | 285.054 |
| −7.450 | 5.807 | 285.054 |
| −7.686 | 6.321 | 285.054 |
| −7.890 | 6.782 | 285.054 |
| −8.073 | 7.216 | 285.054 |
| −8.226 | 7.596 | 285.054 |
| −8.335 | 7.891 | 285.054 |
| −8.411 | 8.131 | 285.054 |
| −8.455 | 8.314 | 285.054 |
| −8.473 | 8.455 | 285.054 |
| −8.470 | 8.533 | 285.054 |
| −8.457 | 8.582 | 285.054 |
| −8.443 | 8.603 | 285.054 |
| −8.434 | 8.611 | 285.054 |
| −8.544 | 9.086 | 288.000 |
| −8.538 | 9.088 | 288.000 |
| −8.525 | 9.091 | 288.000 |
| −8.500 | 9.088 | 288.000 |
| −8.454 | 9.066 | 288.000 |
| −8.391 | 9.018 | 288.000 |
| −8.291 | 8.915 | 288.000 |
| −8.172 | 8.768 | 288.000 |
| −8.021 | 8.564 | 288.000 |
| −7.840 | 8.305 | 288.000 |
| −7.612 | 7.962 | 288.000 |
| −7.354 | 7.564 | 288.000 |
| −7.079 | 7.138 | 288.000 |
| −6.772 | 6.659 | 288.000 |
| −6.432 | 6.125 | 288.000 |
| −6.057 | 5.538 | 288.000 |
| −5.664 | 4.925 | 288.000 |
| −5.253 | 4.286 | 288.000 |
| −4.824 | 3.622 | 288.000 |
| −4.374 | 2.933 | 288.000 |
| −3.905 | 2.219 | 288.000 |
| −3.415 | 1.480 | 288.000 |
| −2.905 | 0.49792 | 288.000 |
| −2.373 | −0.069 | 288.000 |
| −1.838 | −0.853 | 288.000 |
| −1.300 | −1.635 | 288.000 |
| −0.758 | −2.415 | 288.000 |
| −0.214 | −3.194 | 288.000 |
| 0.23125 | −3.970 | 288.000 |
| 0.61319 | −4.743 | 288.000 |
| 1.435 | −5.516 | 288.000 |
| 1.990 | −6.286 | 288.000 |
| 2.547 | −7.055 | 288.000 |
| 3.107 | −7.822 | 288.000 |
| 3.671 | −8.585 | 288.000 |
| 4.220 | −9.321 | 288.000 |

TABLE 1-continued

| X | Y | Z |
|---|---|---|
| 4.754 | −10.028 | 288.000 |
| 5.273 | −10.707 | 288.000 |
| 5.776 | −11.358 | 288.000 |
| 6.263 | −11.982 | 288.000 |
| 6.735 | −12.577 | 288.000 |
| 7.190 | −13.145 | 288.000 |
| 7.611 | −13.660 | 288.000 |
| 7.994 | −14.123 | 288.000 |
| 8.341 | −14.535 | 288.000 |
| 8.649 | −14.896 | 288.000 |
| 8.919 | −15.206 | 288.000 |
| 9.151 | −15.466 | 288.000 |
| 9.351 | −15.686 | 288.000 |
| 9.521 | −15.869 | 288.000 |
| 9.662 | −16.020 | 288.000 |
| 9.775 | −16.139 | 288.000 |
| 9.860 | −16.232 | 288.000 |
| 9.896 | −16.321 | 288.000 |
| 9.893 | −16.401 | 288.000 |
| 9.869 | −16.461 | 288.000 |
| 9.840 | −16.500 | 288.000 |
| 9.803 | −16.531 | 288.000 |
| 9.744 | −16.558 | 288.000 |
| 9.663 | −16.563 | 288.000 |
| 9.573 | −16.528 | 288.000 |
| 9.477 | −16.442 | 288.000 |
| 9.354 | −16.328 | 288.000 |
| 9.199 | −16.186 | 288.000 |
| 9.011 | −16.014 | 288.000 |
| 8.788 | −15.810 | 288.000 |
| 8.525 | −15.571 | 288.000 |
| 8.215 | −15.289 | 288.000 |
| 7.857 | −14.963 | 288.000 |
| 7.453 | −14.593 | 288.000 |
| 7.003 | −14.177 | 288.000 |
| 6.510 | −13.713 | 288.000 |
| 5.973 | −13.202 | 288.000 |
| 5.417 | −12.662 | 288.000 |
| 4.845 | −12.094 | 288.000 |
| 4.258 | −11.498 | 288.000 |
| 3.657 | −10.872 | 288.000 |
| 3.043 | −10.215 | 288.000 |
| 2.418 | −9.527 | 288.000 |
| 1.784 | −8.807 | 288.000 |
| 1.161 | −8.078 | 288.000 |
| 0.38194 | −7.339 | 288.000 |
| −0.048 | −6.591 | 288.000 |
| −0.632 | −5.833 | 288.000 |
| −1.203 | −5.065 | 288.000 |
| −1.762 | −4.287 | 288.000 |
| −2.309 | −3.501 | 288.000 |
| −2.843 | −2.705 | 288.000 |
| −3.364 | −1.899 | 288.000 |
| −3.873 | −1.084 | 288.000 |
| −4.370 | −0.260 | 288.000 |
| −4.838 | 0.37847 | 288.000 |
| −5.280 | 1.331 | 288.000 |
| −5.695 | 2.096 | 288.000 |
| −6.084 | 2.840 | 288.000 |
| −6.448 | 3.560 | 288.000 |
| −6.788 | 4.257 | 288.000 |
| −7.103 | 4.929 | 288.000 |
| −7.396 | 5.576 | 288.000 |
| −7.654 | 6.168 | 288.000 |
| −7.877 | 6.705 | 288.000 |
| −8.068 | 7.184 | 288.000 |
| −8.240 | 7.637 | 288.000 |
| −8.380 | 8.033 | 288.000 |
| −8.480 | 8.340 | 288.000 |
| −8.547 | 8.589 | 288.000 |
| −8.585 | 8.779 | 288.000 |
| −8.597 | 8.924 | 288.000 |
| −8.591 | 9.004 | 288.000 |
| −8.575 | 9.053 | 288.000 |
| −8.559 | 9.074 | 288.000 |
| −8.549 | 9.082 | 288.000 |

At the same time, each blade 10 therefore has an aerodynamic profile which allows a high conversion efficiency and a high useful life to be maintained.

Furthermore, the aerodynamic profile of the blade 10 according to the invention is obtained with the values of Table I by piling up the series of closed curves and grouping them so as to obtain a continuous aerodynamic profile.

In order to take into account the dimensional variability of each blade 10, the profile of each blade 10 can have a tolerance of +/−2 mm in a normal direction with respect to the profile of the blade 10 itself.

The profile of each blade 10 can also comprise a coating, applied subsequently and which varies the profile itself.

Said antiwear coating preferably has a thickness defined in a normal direction at each surface of the blade 10 and ranging from 0 to 0.5 mm.

It is evident, moreover, that the values of the coordinates of Table I can be multiplied or divided by a corrective constant to obtain a profile in a greater or smaller scale, maintaining the same form.

According to another aspect of the present invention, a rotor of a ninth phase of a compressor is provided, which comprises a series of blades 10 of the type described above, each of which having a shaped aerodynamic profile, which are fixed to an outer surface of said rotor so as to be uniformly distanced thereon, and also oriented so as to confer a high efficiency to the compressor in which said rotor is preferably inserted.

According to another aspect of the present invention, a compressor is provided, comprising a rotor of the type described above.

It can thus be seen that a blade of a rotor of a ninth phase of a compressor according to the present invention achieves the objectives specified above.

The rotor blade of a ninth phase of a compressor of the present invention thus conceived, can undergo numerous modifications and variants, all included in the same inventive concept.

Furthermore, in practice, the materials used, as also the dimensions and components, can vary according to technical requirements.

What is claimed is:

1. A blade of a rotor of a ninth phase of a compressor, which can be defined by coordinates of a discreet combination of points, in a Cartesian reference system (X, Y, Z), wherein the axis (Z) is a radial axis intersecting the central axis of the compressor, said blade having an aerodynamic profile which can be identified by means of a series of closed intersection curves between the profile itself and planes (X, Y) lying at distances (Z) from the central axis, said blade comprising:

a base portion fixable to said rotor, the aerodynamic profile extending from a foot at said base portion to a free end distal from said base portion, a first thickening, substantially parallel to said base portion, said first thickening being substantially situated halfway up the blade, and a further thickening, substantially parallel to said base portion and situated close to said free end, said further thickening having a maximum thickness less than a thickness of the blade at said foot, said first thickening and said further thickening being suitable for shifting the natural resonance frequencies of the blade itself outside a functioning frequency range of said rotor.

2. The blade according to claim 1, wherein said blade further comprises:

the aerodynamic profile identified by a first substantially concave surface, which is pressurized, and a second substantially convex surface which is in depression and which is opposite to the first, said two surfaces being continuous and joined to each other to form the aerodynamic profile of said blade.

3. The blade according to claim 2, wherein each closed curve has a maximum thickness determined by the maximum distance between said first surface and said second surface, said maximum thickness of each closed curve, along the height of the blade in the direction of a free end of the blade, first having a decreasing and then an increasing trend, followed again by a decreasing and finally increasing trend, with a discontinuity point of the slope.

4. The blade according to claim 3, wherein along the height of the blade in the direction of its free end, said maximum thickness has a trend according to the following equations, wherein h represents the height of the blade, expressed as a percentage of the total height of the blade, and wherein Tmax is the maximum adimensionalized thickness relating to the closed curve corresponding to the height:

$$T\text{max}=-34.522*h^4+36.4*h^3-8.4113*h^2-0.7259*h+0.9961$$

for height values ranging from 0 to 45%;

$$T\text{max}=-1.3509*h+1.4459$$

for a height ranging from 45% to 58%;

$$T\text{max}=0.2074*h+0.5443$$

for a height ranging from 58% to 86%;

$$T\text{max}=0.9058*h-0.0518$$

for a height ranging from 86% to 100%.

5. A blade of a rotor of a ninth phase of a compressor, which can be defined by coordinates of a discreet combination of points, in a Cartesian reference system (X, Y, Z), wherein the axis (Z) is a radial axis intersecting the central axis of the compressor, said blade having an aerodynamic profile which can be identified by means of a series of closed intersection curves between the profile itself and planes (X, Y) lying at distances (Z) from the central axis, said blade comprising:

a base portion fixable to said rotor, the aerodynamic profile having a surface extending from a foot at said base portion to a free end distal from said base portion, a first thickening, substantially parallel to said base portion, said first thickening being substantially situated halfway up the blade, a further thickening, substantially parallel to said base portion and situated close to said free end, said further thickening having a maximum thickness less than a thickness of the blade at said foot, and said first thickening and said further thickening being suitable for shifting the natural resonance frequencies of the blade itself outside a functioning frequency range of said rotor;

wherein said closed curves are defined according to Table I, whose values, expressed in millimeters, refer to a profile at room temperature.

6. The blade according to claim 5, wherein the profile of said blade has a tolerance of +/−2 mm in a normal direction with respect to the profile of the blade itself.

7. The blade according to claim 6, further comprising an antiwear coating on the surface.

8. The blade according to claim 7, wherein said coating has a thickness ranging from 0 to 0.5 mm.

9. A rotor of a ninth phase of a compressor, comprising a series of blades according to claim 1.

10. The rotor according to claim 9, wherein said series of blades is constrained to an outer surface of said rotor and said series of blades is also uniformly distributed thereon in order to maximize the efficiency of the rotor itself.

11. A compressor characterized in that it comprises a rotor according to claim 9.

12. A blade of a rotor of a compressor, which can be defined by coordinates of a discreet combination of points, in a Cartesian reference system (X, Y, Z), wherein the axis (Z) is a radial axis intersecting the central axis of the compressor, said blade having a profile defining the surface of the blade which can be identified by means of a series of closed intersection curves between the profile itself and planes (X, Y) lying at distances (Z) from the central axis, said blade comprising said closed curves defined according to Table I, whose values, expressed in millimeters, refer to a profile at room temperature.

13. The blade according to claim 12, wherein the profile of said blade has a tolerance of +/−2 mm in a normal direction with respect to the profile of the blade itself.

14. The blade according to claim 13, further comprising an antiwear coating on the blade surface.

15. The blade according to claim 14, wherein said coating has a thickness ranging from 0 to 0.5 mm.

16. The blade according to claim 12 wherein the values of the coordinates of Table 1 are multiplied by a corrective constant to obtain a scaled profile maintaining the same form.

17. A rotor of a ninth phase of a compressor, the rotor comprising a series of blades according to claim 12.

18. The rotor according to claim 12, wherein said series of blades is constrained to an outer surface of said rotor and said series of blades is also uniformly distributed thereon in order to maximize the efficiency of the rotor itself.

19. A compressor that comprises a rotor according to claim 12.

* * * * *